United States Patent
Takagi

(10) Patent No.: US 6,969,440 B2
(45) Date of Patent: Nov. 29, 2005

(54) PNEUMATIC TIRE, METHOD FOR MANUFACTURING THE SAME AND METHOD FOR MANUFACTURING BODY PLY

(75) Inventor: Shigemasa Takagi, Hashima (JP)

(73) Assignee: Fuji Seiko Co., Ltd., Gifu-ken (JP)

( * ) Notice: Subject to any disclaimer, the term of this patent is extended or adjusted under 35 U.S.C. 154(b) by 167 days.

(21) Appl. No.: 10/143,523

(22) Filed: May 9, 2002

(65) Prior Publication Data

US 2002/0195186 A1 Dec. 26, 2002

(30) Foreign Application Priority Data

| May 11, 2001 | (JP) | 2001-142288 |
| May 14, 2001 | (JP) | 2001-143538 |
| Jun. 8, 2001 | (JP) | 2001-174098 |
| Mar. 29, 2002 | (JP) | 2002-097063 |
| Apr. 3, 2002 | (JP) | 2002-101503 |

(51) Int. Cl.$^7$ .......................................... B29D 30/32
(52) U.S. Cl. ................. 156/132; 156/133; 152/554
(58) Field of Search ..................... 156/131, 132, 156/133, 135, 400, 402, 398, 416, 414, 415; 152/550, 554, 542, 555

(56) References Cited

U.S. PATENT DOCUMENTS

| 2,455,038 A | * | 11/1948 | Breth ........................ 156/402 |
| 3,016,321 A | * | 1/1962 | Beckadolph et al. ....... 156/402 |
| 3,035,629 A | * | 5/1962 | Vanzo et al. ................ 156/403 |
| 3,237,199 A | * | 2/1966 | Brey .......................... 156/398 |
| 4,269,649 A | * | 5/1981 | Vanderzee .................. 156/416 |
| 5,529,107 A | * | 6/1996 | Iwamura .................... 152/542 |
| 5,772,836 A | * | 6/1998 | Ogawa ...................... 156/400 |
| 5,885,387 A | * | 3/1999 | Ueyoko ..................... 152/540 |
| 2001/0025682 A1 | * | 10/2001 | Caretta ...................... 156/123 |

FOREIGN PATENT DOCUMENTS

| JP | 2001-130215 | 5/2001 |
| JP | 2001-145961 | 5/2001 |

* cited by examiner

Primary Examiner—Geoffrey L. Knable

(74) Attorney, Agent, or Firm—Marsh Fischmann & Breyfogle LLP

(57) ABSTRACT

A cylindrical body ply is mounted around a cylindrical bladder, and annular beads are set on both axial end portions of the body ply. In this state, while the spacing between both axial ends of the body ply is narrowed, an axial intermediate portion of the body ply is increased in diameter by the bladder. Subsequently, bending members formed of rigid bodies are radially moved from the inside to the outside of the body ply to bend both axial end portions of the body ply by the bending members. The bent portions of the body ply wrap around corresponding beads. With the use of the body ply manufactured in this way in a tire, the resulting tire can be reduced in the manufacturing cost and weight.

10 Claims, 30 Drawing Sheets

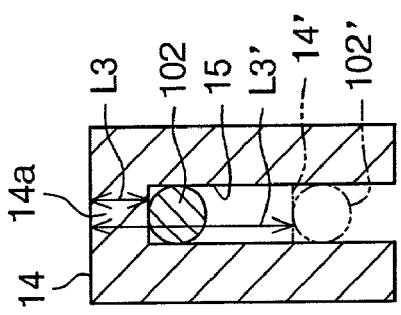
Fig.24
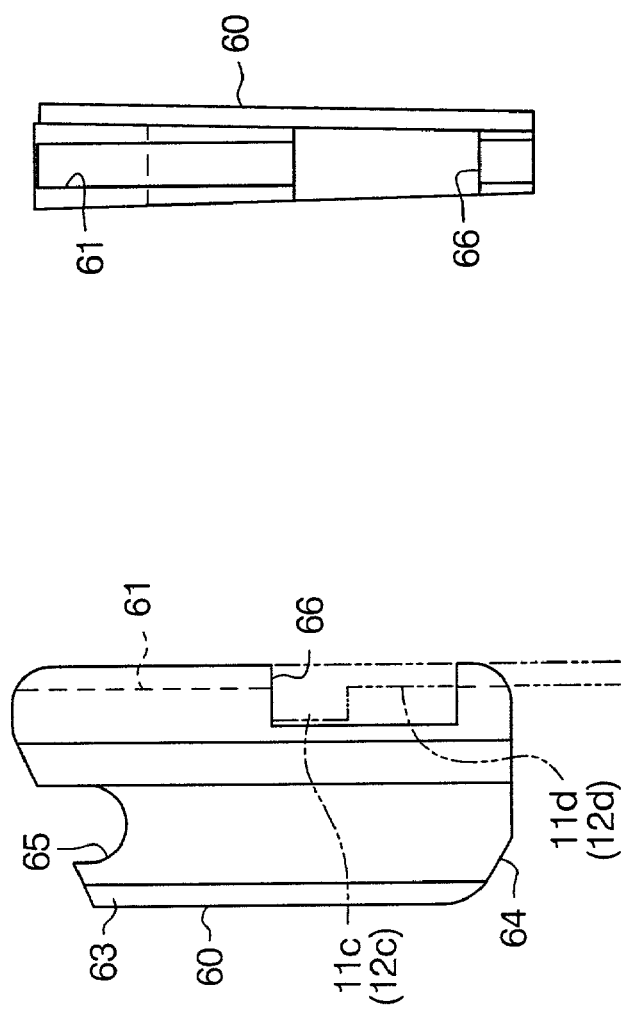
Fig.23
Fig.22

Fig.36
Hardness of Rubber (JIS Hardness)
| Rubber of Outer Layer | A65 |
|---|---|
| Rubber of Inner Layer | A65 |
Fig.37
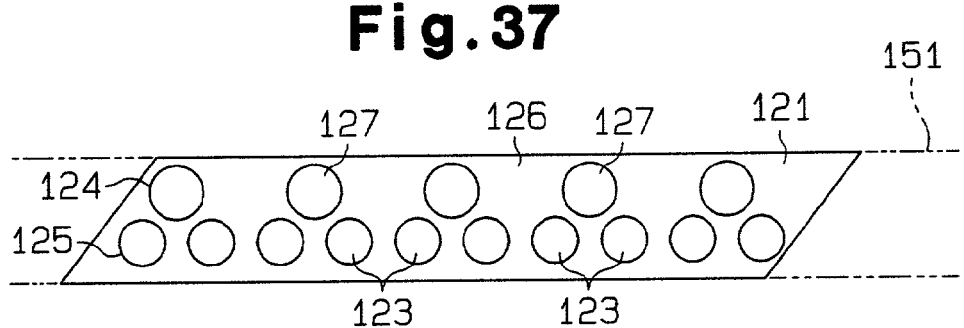
Fig.38
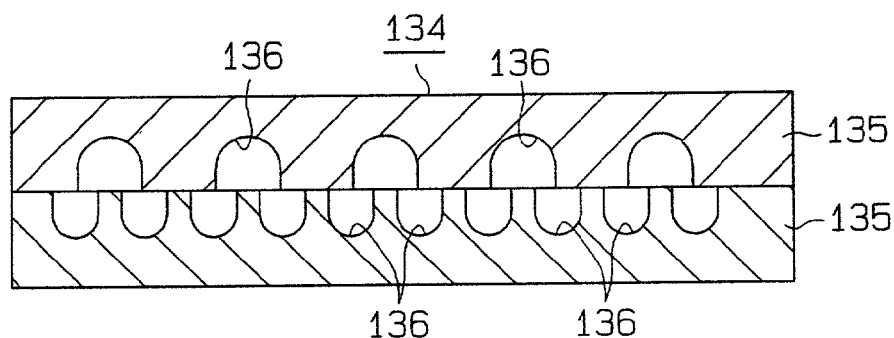
Fig.39
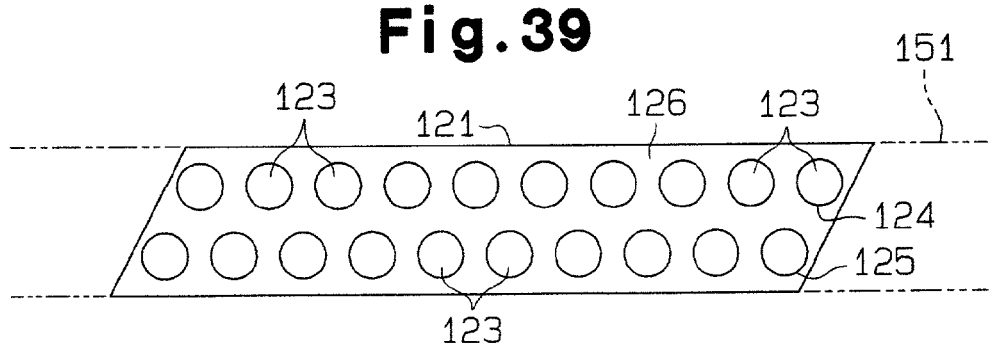

Fig.43
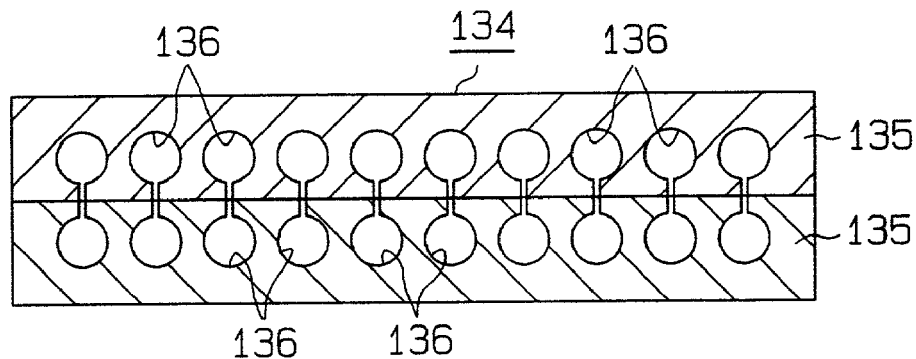
Fig.44
Hardness of Rubber (JIS Hardness)
|  | Example 1 | Example 2 |
|---|---|---|
| Rubber of Outer Layer | A68 (Hard) | A62 (Soft) |
| Rubber of Inner Layer | A65 (Ordinary) | A68 (Hard) |
Fig.45
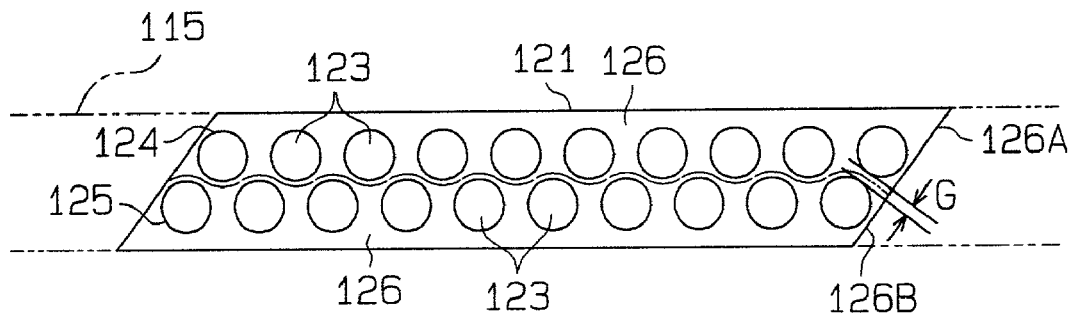

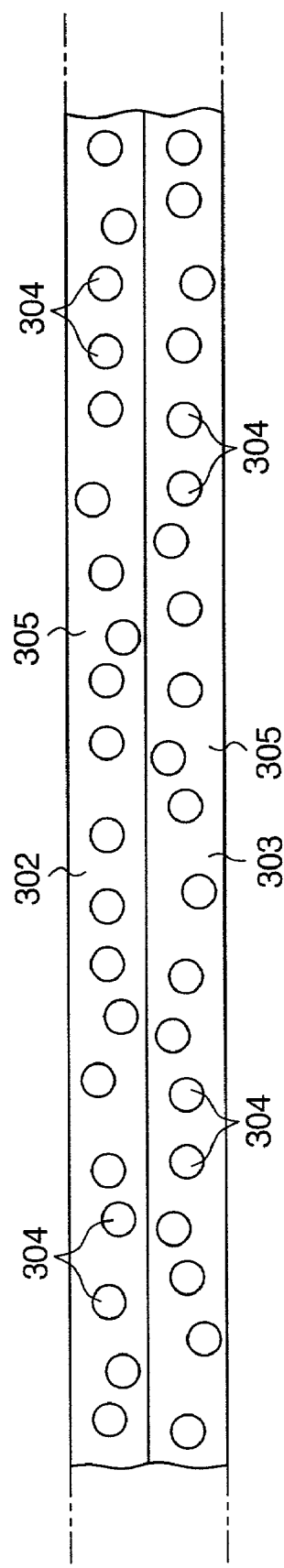
Fig.48 (PriorArt)

PNEUMATIC TIRE, METHOD FOR MANUFACTURING THE SAME AND METHOD FOR MANUFACTURING BODY PLY

BACKGROUND OF THE INVENTION

The present invention relates to a pneumatic tire and a manufacturing method therefor, and more particularly, to techniques related to a body ply which forms a bead portion of a pneumatic tire and the skeleton of the tire.

FIG. 46 shows a cross section of a general pneumatic tire 351 mounted on a vehicle. This tire 351 comprises a tread 351d; a pair of side walls extending inward from both edges of the tread 351d in a radial direction of the tire 351; and a pair of bead portions 351b mounted to a wheel rim 352. A bead 354 made up of a bead core 354a and a bead filler 354b is disposed in each of the bead portions 351b. Both crosswise ends (both axial ends) of a body ply 353 forming the skeleton of the tire 351 are bent to wrap the beads 354 therein.

A radial intermediate portion of the side wall is a maximum cross-sectional width portion 351a at which the tire 351 has a maximum width of cross-section. While the vehicle is running, a large load such as a compression load acts on a portion of the side wall between the maximum cross-sectional width portion 351a and the bead portion 351b, i.e., an inner side portion 351c of the side wall. When edges 353b of bent portions 353a of both crosswise ends of the body ply 353 are arranged in the inner side portion 351c, a stress concentrates on the edges 353b. This concentrated stress causes the occurrence of a crack and growth of the crack on the edges 353b.

For avoiding such a concentrated stress, the bent portion 353a of the body ply 353 must be extended to the vicinity of the tread 351d beyond the maximum cross-sectional width portion 351a, the edges 353b of the bent portion 353a must be covered with a coating layer, or the bent portion 353a must be reduced in length such that their edges 353b are fixed within a region of a flange of the wheel rim 352. In this event, from the viewpoint of a reduction in the manufacturing cost and weight, it is desirable that the edges 353b of the bent portion 353a be fixed within the region of the flange of the wheel rim 352. However, conventional tire manufacturing methods have failed to meet such requirements as described below.

FIGS. 47(a) to 47(c) show a conventional method for mounting the bead 354 to the body ply 353. In this conventional method, as shown in FIG. 47(a), the body ply 353 formed in a cylindrical shape is first set on a drum 355. In this event, both width edges of the body ply 353 protrude from the drum 355 and are supported by a flat bladder 356. Also, the bead 354 is assembled in a portion of the body ply 353 protruding from the drum 355. It should be noted that FIGS. 47(a) to 47(c) show one crosswise end portion only of body ply 353.

Next, as shown in FIG. 47(b), air is injected into the bladder 356. This causes the bladder 356 to inflate to erect the crosswise end portions of the body ply 353.

Further, as shown in FIG. 47(c), the bladder 356 is continuously inflated, and a push can 357 made of a metal presses the bladder 356 toward the drum 355. This pressing bends the body ply 353 such that a crosswise end portion thereof is bent over, and the bead 354 is wrapped around by the bent portion 353a. Subsequently, the drum 355 is contracted in the radial direction, and the body ply 353 wrapping around the bead 354 is removed from the drum 355 and sent to the next process.

As shown in FIG. 47(b), in an initial stage of the inflation of the bladder 356, a relatively small outer diameter of the bladder 356 fails to sufficiently erect the crosswise end of the body ply 353. For this reason, when the bent portion 353a of the body ply 353 is short, the bent portion 353 hangs down by its own weight, or the bent portion 353a is wrinkled. Therefore, for avoiding the aforementioned problem of concentrated stress, conventional methods must extend the bent portion 353a to the vicinity of the tread 351d, or cover the edge 353b of the bent portion 353a with a coating layer, which however is insufficient to reduce the manufacturing cost and weight.

Also, sport-oriented vehicles which are required to have high running performance often employ tires having a high oblateness. Such a flat tire is required to have a highly rigid and flexible side wall. Such a flat tire must also prevent cords within a body ply from being cut by an impact which could be applied thereto when the tire runs on a cat's eye embedded in a road. To meet such requirements, there exists a flat tire which comprises two layers of body plies 302, 303 as shown in FIG. 48.

The body plies 302, 303 are generally manufactured in the following manner. Specifically, a wide and long tyre fabric cord array comprised of a large number (for example, approximately 1500) of parallel cords 304 is coated with a rubber 305 by a calendar. This results in the formation of a wide and long sheet-shaped product having the cord array embedded in the rubber 305. Next, the sheet-shaped product is cut by a cutter into a required width to fabricate two body plies 302, 303 which are different in width and length from each other. Then, these body plies 303, 303 are sequentially wrapped around a cylindrical drum and overlapped one around the other to form a two-layer body ply.

If both body plies 302, 303 have edges (corresponding to the edge 353b of the body ply 353 in FIG. 46) aligned with each other, a stress will concentrate on the edge portions, so that a crack is more likely to grow from the edges. For this reason, the body plies 302, 303 are made different in width such that the edges of the body plies 302, 303 are not aligned with each other.

A tire disclosed in Japanese Unexamined Patent Publication No. 2001-130215employs a body ply made up of a plurality of layers of cord arrays for improving the strength of the tire for use in large vehicles. The body ply disclosed in this official gazette is manufactured in the following manner. Specifically, tire fabric cord arrays each drawn out of a plurality of reels are stacked, and are coated with a rubber by a calendar. This results in the formation of a wide and long sheet-shaped product having a plurality of layers of cord arrays embedded in the rubber. The resulting sheet-shaped product is used as a material for the body ply.

For manufacturing the wide and long sheet-shaped product for use as a material for a body ply, a large number of reels are installed in accordance with the number of cords, or a large reel must be provided for wrapping a tyre fabric cord array made up of a large number of cords. Furthermore, a large calendar and a large cutter must be installed in accordance with the width of the sheet-shaped product. In addition, a large space must be ensured for transporting and storing the wide and long sheet-shaped product. Thus, the cost of installation required for manufacturing the body ply is increased to cause a higher tire manufacturing cost.

As a technique for solving the problems mentioned above, Japanese Unexamined Patent Publication No. 2001-145961 discloses a technique of manufacturing a sheet-shaped product for use as a material for a complete body ply by wrapping a drum with an elongated ribbon embedded with cords to form a cylinder and cutting the cylinder into the sheet-shaped product. However, for manufacturing two layers of body plies, it is necessary to provide two types of drums each having different diameters in accordance with the sizes of the two body plies. This results in complicated facilities required for manufacturing the body plies, and complicated manufacturing processes. Also, tedious changes in facilities will be involved in a change in the type of tire to be manufactured, which constitutes a factor of a higher tire manufacturing cost.

SUMMARY OF THE INVENTION

It is an object of the present invention to provide a pneumatic tire and a manufacturing method therefor which are capable of reducing the manufacturing cost and the weight of the tire.

It is another object of the present invention to facilitate the manufacturing of a body ply having a plurality of layers of cord arrays at a low cost and with simple facilities.

To achieve the above object, a method of manufacturing a pneumatic tire according to the present invention comprises the steps of mounting a cylindrical body ply on a cylindrical surface, setting annular beads on both axial end portions of the body ply, and moving bending members formed of rigid bodies radially from the inside to the outside of the body ply to bend the both axial end portions of the body ply by the bending members, so that bent portions of the body ply wrap around the beads corresponding thereto.

Another method of manufacturing a pneumatic tire according to the present invention comprises the steps of mounting a cylindrical body ply on a cylindrical surface, setting annular beads on both axial end portions of the body ply, pressing portions of the body ply on which the beads are disposed by pressing members formed of rigid bodies radially from the inside to the outside to bring the portions of the body ply on which the beads are disposed into close contact with the beads, and increasing the diameter of an axial intermediate portion of the body ply while narrowing the spacing between both axial ends of the body ply, wherein both the axial end portions of the body ply are bent at positions corresponding to the beads associated with the increase in the diameter of the body ply.

The present invention also provides a pneumatic tire which comprises a pair of bead portions mounted on a wheel rim, a pair of annular beads disposed in the bead portions, respectively, and a toroidal body ply forming a skeleton of the tire. The body ply has a pair of bent portions respectively held by the beads, and the bent portions have their edges held in a region of the wheel rim.

The present invention also provides a method of manufacturing a body ply for a pneumatic tire. The method comprises the steps of stacking a plurality of cord arrays, each made up of a plurality of parallel cords, coating the cord arrays with a coating rubber to create an elongated ribbon which is substantially rectangular in cross section, winding the ribbon spirally to form a cylinder, cutting the cylinder in a direction orthogonal to a direction in which the ribbon extends to create a sheet-shaped plane body ply, and forming a cylindrical body ply from the sheet-shaped body ply, wherein the cords extend along the axial line of the cylindrical body ply.

The present invention further provides an elongated ribbon for use in manufacturing a body ply for a pneumatic tire. The ribbon comprises a plurality of cord arrays arranged in stack, each made up of a plurality of parallel cords, and a coating rubber substantially rectangular in cross section for coating the cord arrays.

BRIEF DESCRIPTION OF THE DRAWINGS

The features of the present invention believed to be novel will become apparent particularly in the appended claims. The present invention together with its objects and advantages will be understood by the following description of presently preferred embodiments with reference to the accompanying drawings, wherein:

FIG. 22 is a front view of the bending member;

FIG. 23 is a side view of the bending member;

FIG. 24 is a cross-sectional view of an insert barrel;

FIG. 36 is a table showing the hardness of coating rubbers for a body ply;

FIG. 37 is a cross-sectional view of a ribbon in a sixth embodiment of the present invention;

FIG. 38 is a cross-sectional view of a guide member for use in the manufacturing of the ribbon in FIG. 37;

FIG. 39 is a cross-sectional view of a ribbon in a seventh embodiment of the present invention;

FIG. 43 is a cross-sectional view of a guide member for use in the manufacturing of the ribbon in FIG. 42;

FIG. 44 is a table showing the hardness of coating rubbers for a ribbon in a ninth embodiment of the present invention;

FIG. 45 is a cross-sectional view of the ribbon in the ninth embodiment;

FIG. 48 is a cross-sectional view showing a conventional two-layer body ply.

DETAILED DESCRIPTION OF PREFERRED EMBODIMENTS

In the following, a first embodiment of the present invention will be described with reference to FIGS. 1 to 8.

Figure 1:
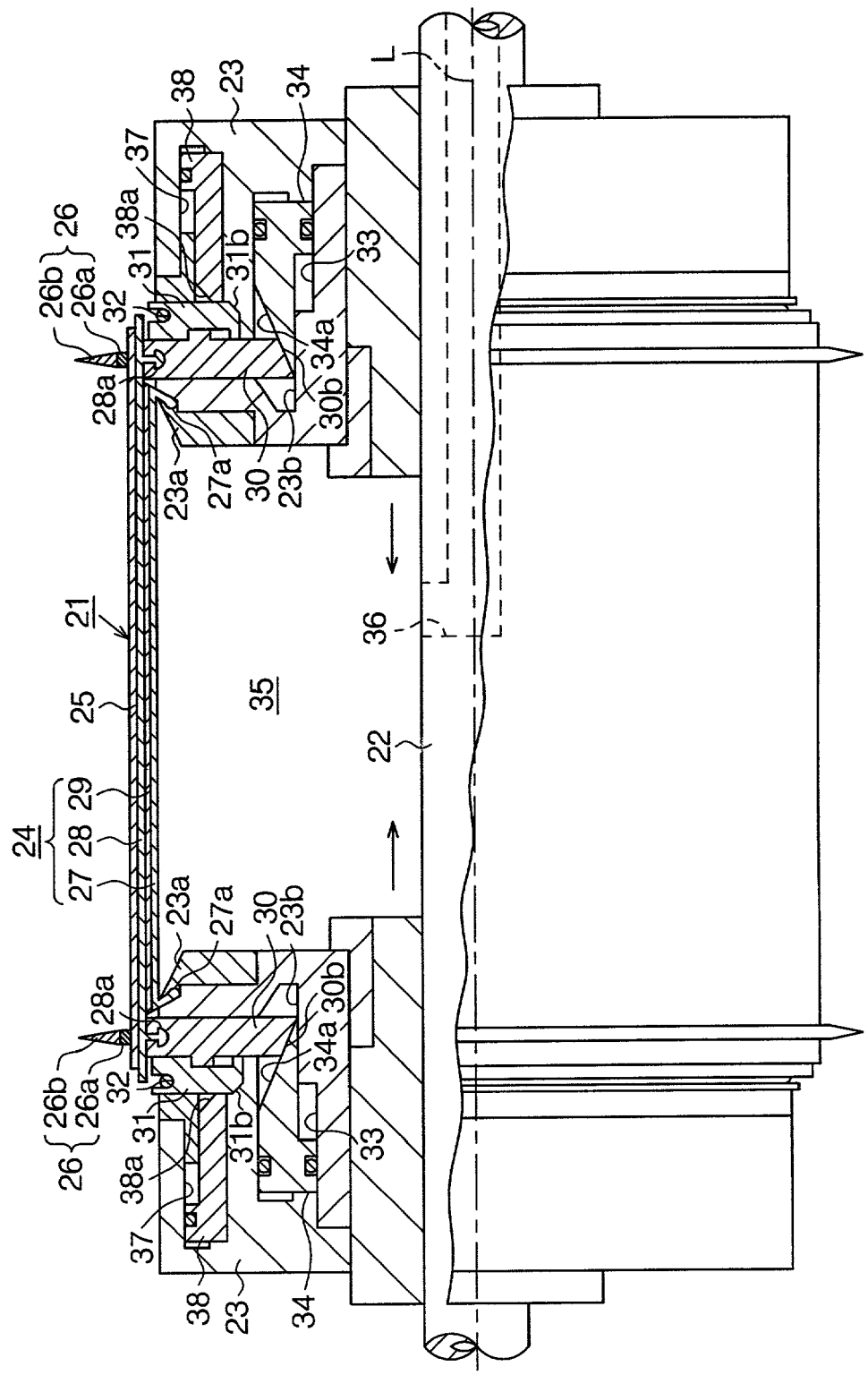
FIG. 1 is a partially broken front view showing a tire forming apparatus in a first embodiment of the present invention.
Figure 2:
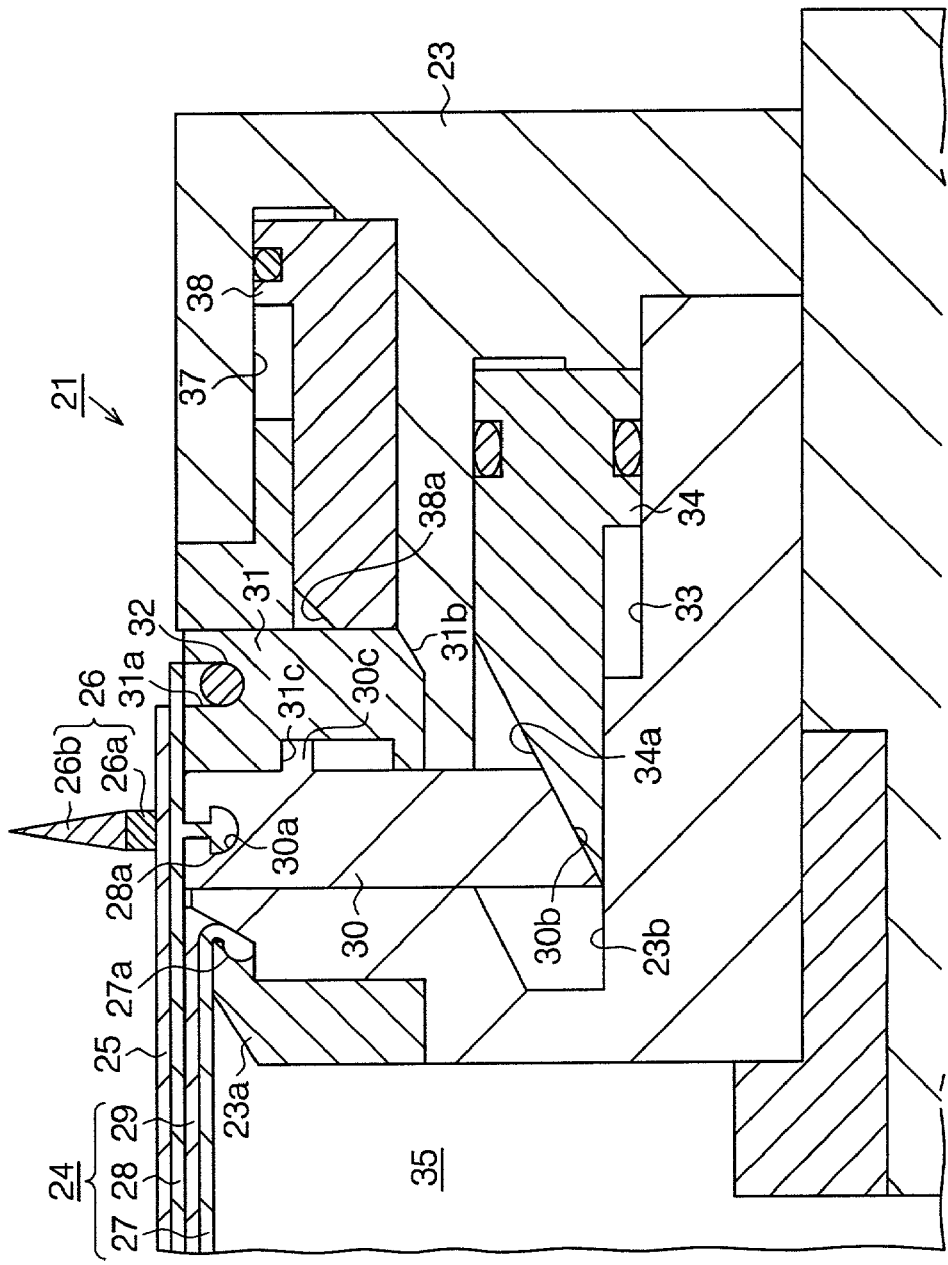
FIG. 2 is a partial cross-sectional view showing a portion of the tire forming apparatus in FIG. 1 in an enlarged view.

As shown in FIGS. 1 and 2, a tire forming apparatus 21 of this embodiment comprises an operating shaft 22, and a pair of right and left annular movable bodies 23 supported on the operating shaft 22. By driving means, not shown, both movable bodies 23 can be moved closer to and away from each other along an axial line L of the operating shaft 22. A bladder mount 23a is disposed on an inner peripheral edge of each movable body 23.

Both edges of cylindrical bladders 24 are mounted to both bladder mounts 23a, respectively. A body ply 25, which has been previously formed in a cylindrical shape in a previous step, is fitted on the outer peripheral surface of the bladder 24. Also, an annular bead 26 made up of a bead core 26a and a bead filler 26b is fitted on each of both crosswise ends (both axial ends) of the body ply 25.

The bladder 24 comprises an inner elastic material 27; an outer elastic material 28; and a core material 29 disposed between both elastic materials 27, 28. The core material 29 includes a plurality of linear materials extending in an axial direction of the bladder 24; and a plurality of linear materials extending in a circumferential direction of the bladder 24. A material having a high tensile strength and little permanent distortion, for example, an aramid fiber is used for these linear materials. Thus, the bladder 24 is readily flexible, but hardly expands or contracts. Annular mount protrusions 27a are formed on inner peripheral surfaces of both crosswise end portions of the inner elastic material 27. Also, annular coupling protrusions 28a are formed on inner peripheral surfaces of both crosswise end portions of the outer elastic material 28. Each mount protrusion 27a is fitted in a corresponding bladder mount 23a. The coupling protrusion 28a is fitted in coupling recesses 30a of a plurality of pressing members 30 supported by the corresponding movable body 23.

Figure 3:
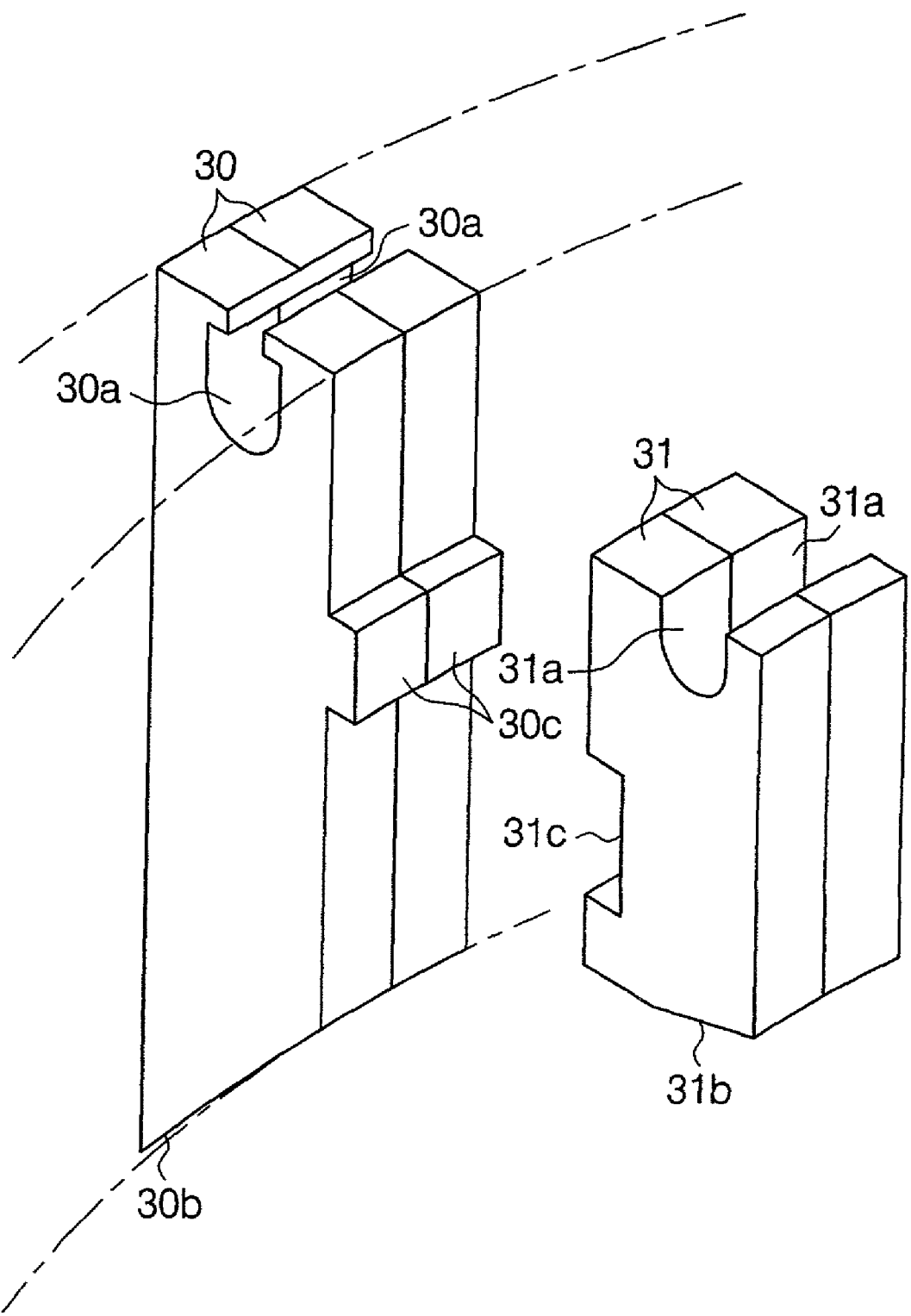
FIG. 3 is an exploded perspective view showing a bending member and a pressing member shown in FIG. 2 in an enlarged view.

As shown in FIGS. 1 to 3, each of the movable bodies 23 is formed with an annular receiving recess 23b on the outer peripheral surface. A plurality of the pressing members 30 are received in the receiving recesses 23b of the respective movable bodies 23 such that they extend radially about the axial line L of the operating shaft 22 and are arranged along the circumferential direction of the corresponding movable bodies 23. These pressing members 30 are radially movable with respect to the corresponding movable bodies 23. Each pressing member 30 comprises a rigid body made of a hard synthetic resin or the like. The coupling recess 30a is formed in an outer end portion of each pressing member 30 such that the coupling protrusion 28a of the bladder 24 is fitted thereinto. Also, each pressing member 30 is formed with an inclined surface 30b in an inner end portion, and an engaging protrusion 30c is formed on a side surface of each pressing member 30.

A plurality of bending members 31 each comprising a rigid body made of a hard synthetic resin or the like are received in the receiving recesses 23b of the respective movable bodies 23 such that they radially extend about the axial line L of the operating shaft 22 and they are arranged along the circumferential direction of the corresponding movable bodies 23. These bending members 31 are radially movable with respect to the corresponding movable bodies 23. Also, each bending member 31 is arranged to be adjacent to one of the pressing members 30. Each bending member 31 is formed with a stopping groove 31a in an outer end portion. Each bending member 31 is formed with an inclined surface 31b in an inner end portion. Each bending member 31 is formed with an engaging recess 31c in a side surface thereof for engagement with the engaging protrusion 30c of a corresponding pressing member 30. In respect to the radial direction of the movable body 23, the engaging recess 31c is longer than the engaging protrusion 30c. Therefore, the bending member 31 can be movable in the radial direction of the movable body 23 with respect to the corresponding pressing member 30.

Annular springs 32 are hung by stopping grooves 31a of a plurality of bending members 31 supported on the respective movable bodies 23. The springs 32 urge the bending members 31 toward the center of the corresponding movable bodies 23, i.e., in a direction in which the bending members 31 are fitted into the receiving recesses 23b. The engaging recess 31c of each bending member 31 is in engagement with the engaging protrusion 30c of a corresponding pressing member 30. Therefore, each pressing member 30 is urged by a corresponding bending member 31 in the same direction as the bending member 31.

As shown in FIG. 1, both crosswise ends of the body ply 25 extend to positions corresponding to the bending members 31, respectively. Also, both beads 26 are arranged at positions corresponding to the pressing members 30, respectively.

As shown in FIGS. 1 and 2, each of the movable bodies 23 has an annular inner cylinder chamber 33 arranged concentrically with the operating shaft 22. An annular inner piston 34 is disposed in the inner cylinder chamber 33 for movement along the axial line L of the operating shaft 22. The inner piston 34 has an inclined cam face 34a on its inner peripheral surface, in engagement with the inclined surface 30b of the pressing member 30 supported on a corresponding movable body 23.

Figure 4:
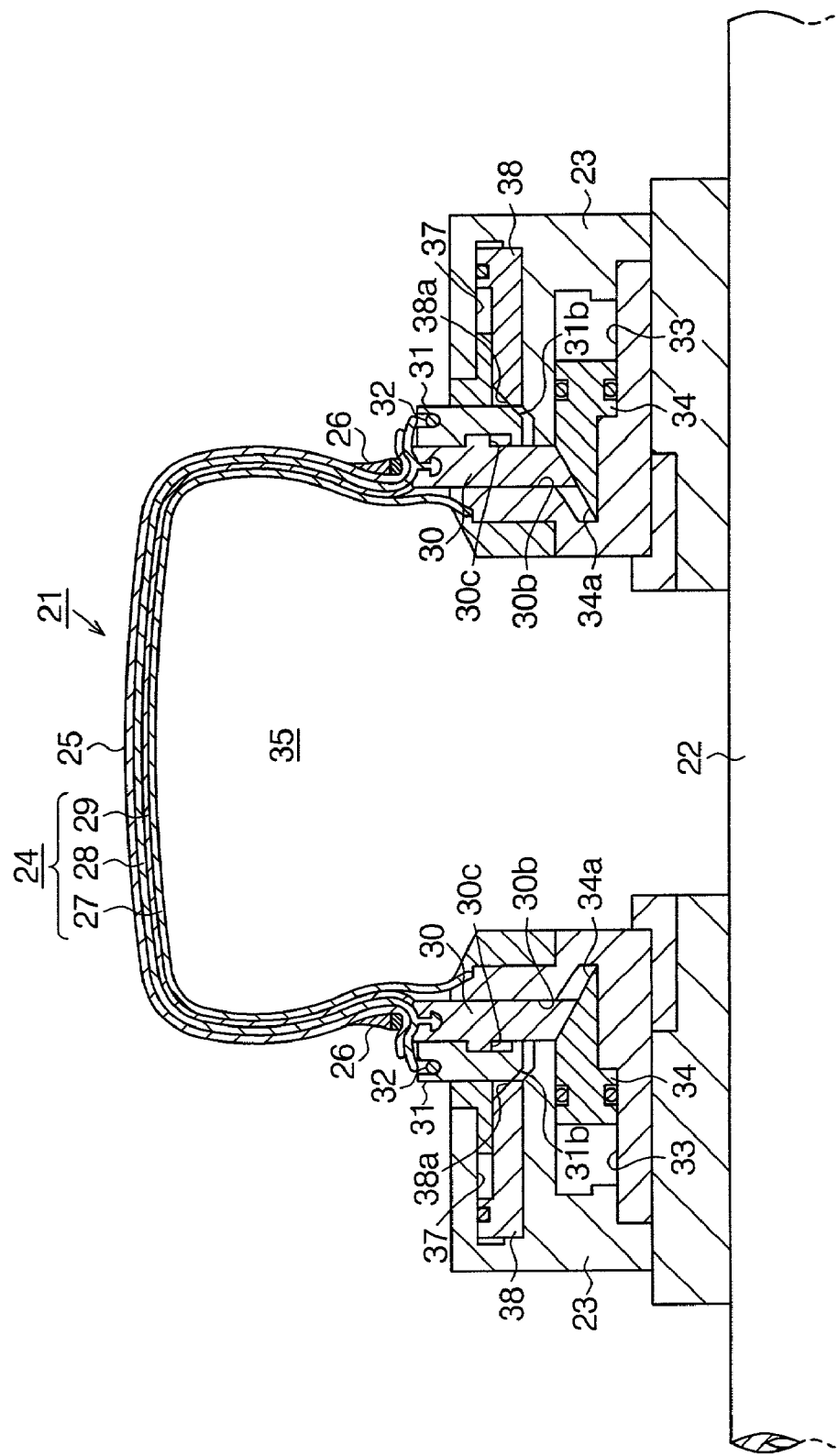
FIG. 4 is a partial cross-sectional view showing an operating state of the tire forming apparatus in FIG. 1.

As compressed air is supplied to each inner cylinder chamber 33, the inner piston 34 is moved from a position indicated in FIG. 1 to the pressing member 30 and reaches a position indicated in FIG. 4. Associated with this movement, each pressing member 30 is radially protruded outward from the corresponding movable body 23, in cooperation of the inclined cam face 34a with the inclined surface 30b, against an urging force of the spring 32, as shown in FIG. 4. The pressing member 30 thus protruded presses a portion of the body ply 25, on which the beads 26 are arranged, outward in the radial direction, and these portions are brought into close contact with the inner surface of the bead cores 26a and the bladder 24 so as not to slip off.

Also, when each pressing member 30 is protruded, a corresponding bending member 31 is also moved outward in the radial direction with respect to the movable body 23 by the engagement of the engaging protrusion 30c with the engaging recess 31c. As shown in FIG. 4, the movement of the bending member 31 causes the inclined surface 31b of the bending member 31 to be placed at a position at which the inclined surface 31b can come into engagement with an inclined cam face 38a of an outer piston 38, which will be described later.

As shown in FIG. 1, an inner space 35 is formed within the bladder 24 between both movable bodies 23. In communication with the inner space 35, an air supply path 36 is formed within the operating shaft 22 along the axial line L of the operating shaft 22. As shown in FIG. 4, the width between both crosswise ends of the body ply 25 is gradually narrowed by the movement of both movable bodies 23 closer to each other. As compressed air is supplied from the air supply path 36 to the inner space 35 as a pressure medium, the bladder 24 is deformed outward in the radial direction. The deformation of the bladder 24 causes deformation of the body ply 25 into a toroidal shape, as its diameter is increased in an intermediate portion in the axial direction.

As shown in FIGS. 1 and 2, each of the movable bodies 23 has an annular outer cylinder chamber 37 concentric with the operating shaft 22 and arranged around the inner cylinder chamber 33. In each outer cylinder chamber 37, the annular outer piston 38 is disposed for movement along the axial line L of the operating shaft 22. The inclined cam face 38a is formed on an inner peripheral surface of the outer piston 38. As compressed air is supplied into each outer cylinder chamber 37, the outer piston 38 is moved from the position indicated in FIG. 4 toward the bending member 31, and reaches a position indicated in FIG. 5. Associated with this movement, each bending member 31 is protruded outward in the radial direction from the movable body 23 in cooperation of the inclined cam face 38a with the inclined surface 31b. The protruded bending member 31 bends over both crosswise end portions of the body ply 25. The bead 26 is wrapped by a bent portion of the body ply 25, i.e., the bent portion 25a.

Figure 6:
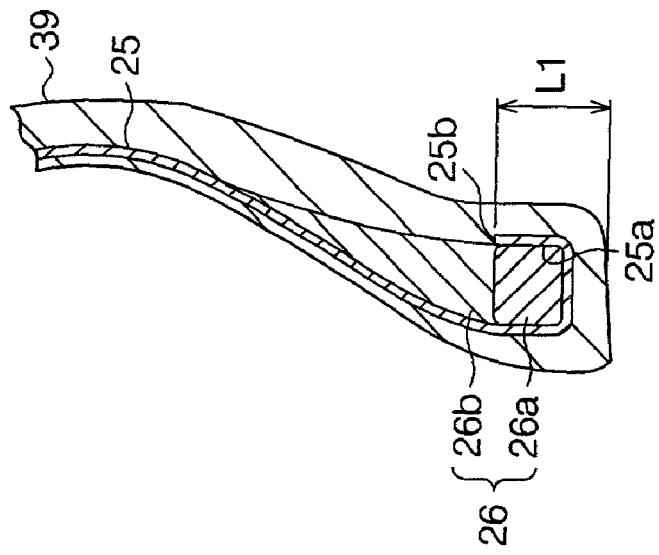
FIG. 6 is a partial cross-sectional view of a tire which is manufactured by the tire forming apparatus in FIG. 1.

In this embodiment, as shown in FIG. 6, the position of an edge 25b of the bent portion 25a is set equal to or lower than a height H of a rim flange 40a in a wheel rim 40, and preferably within a range of one half or less of the height H of the rim flange 40a. L1 shown in FIG. 6 indicates the height from a proximal end of the rim flange 40a to the edge of the bent portion 25a, i.e., the height of the edge 25b of the bent portion 25a. In a pneumatic tire 39 after formation, the edge 25b of the bent portion 25a is disposed within a bead portion 39a of the tire 39 mounted to the wheel rim 40.

Next, description will be made on a tire formation procedure using the tire forming apparatus 21 configured as described above.

First, as shown in FIG. 1, the cylindrical body ply 25 is placed on the outer peripheral surface (cylindrical surface) of the bladder 24 with both movable bodies 23 spaced away from each other, and the beads 26 are set on both crosswise end portions of the body ply 25. In this state, the inner and outer pistons 34, 38 are placed at retracted positions, and a plurality of pressing members 30 and bending members 31 are placed at positions at which they are fitted into the movable bodies 23 by urging forces of the springs 32.

Both crosswise end portions of the body ply 25 extend to positions corresponding to the bending members 31 beyond the pressing members 30. Also, both beads 26 are arranged at positions corresponding to the pressing members 30. In accordance with the positioning of the beads 26 with respect to the body ply 25, the length of the bent portion 25a, in other words, the position of the edge 25b of the bent portion 25a is determined with respect to the rim flange 40a.

Next, as compressed air is supplied into the inner cylinder chamber 33, the inner piston 34 is moved toward the pressing member 30, as shown in FIG. 4. Associated with this movement, each pressing member 30 is protruded outward in the radial direction from the movable body 23 in cooperation of the inclined cam face 34a with the inclined surface 30b. The protruded pressing member 30 presses a portion of the body ply 25 in which the beads 26 are disposed to the outside in the radial direction, and these portions are brought into close contact with the bead cores 26a and bladder 24 so as not to slip off.

At the same time compressed air is supplied to the inner cylinder chamber 33, compressed air is also supplied to the inner space 35 of the bladder 24 from the air supply path 36. Together with this, both movable bodies 23 are moved in a direction in which they come closer to each other to narrow the spacing between both crosswise ends of the body ply 25. As a result, as shown in FIG. 4, the bladder 24 is deformed outward in the radial direction, with an increase in the diameter of an intermediate portion in the axial direction of the body ply 25, resulting in deformation of the body ply 25 into a toroidal shape. Both crosswise end portions of the body ply 25 are bent at positions corresponding to the bead cores 26a.

As the pressing member 30 is protruded, the engaging protrusion 30c comes into engagement with the engaging recess 31c to move the bending member 31 outward in the radial direction with respect to the movable body 23. This movement brings the inclined surface 31b of the bending member 31 to a position at which it can come into engagement with the inclined cam face 38a of the outer piston 38.

Figure 5:
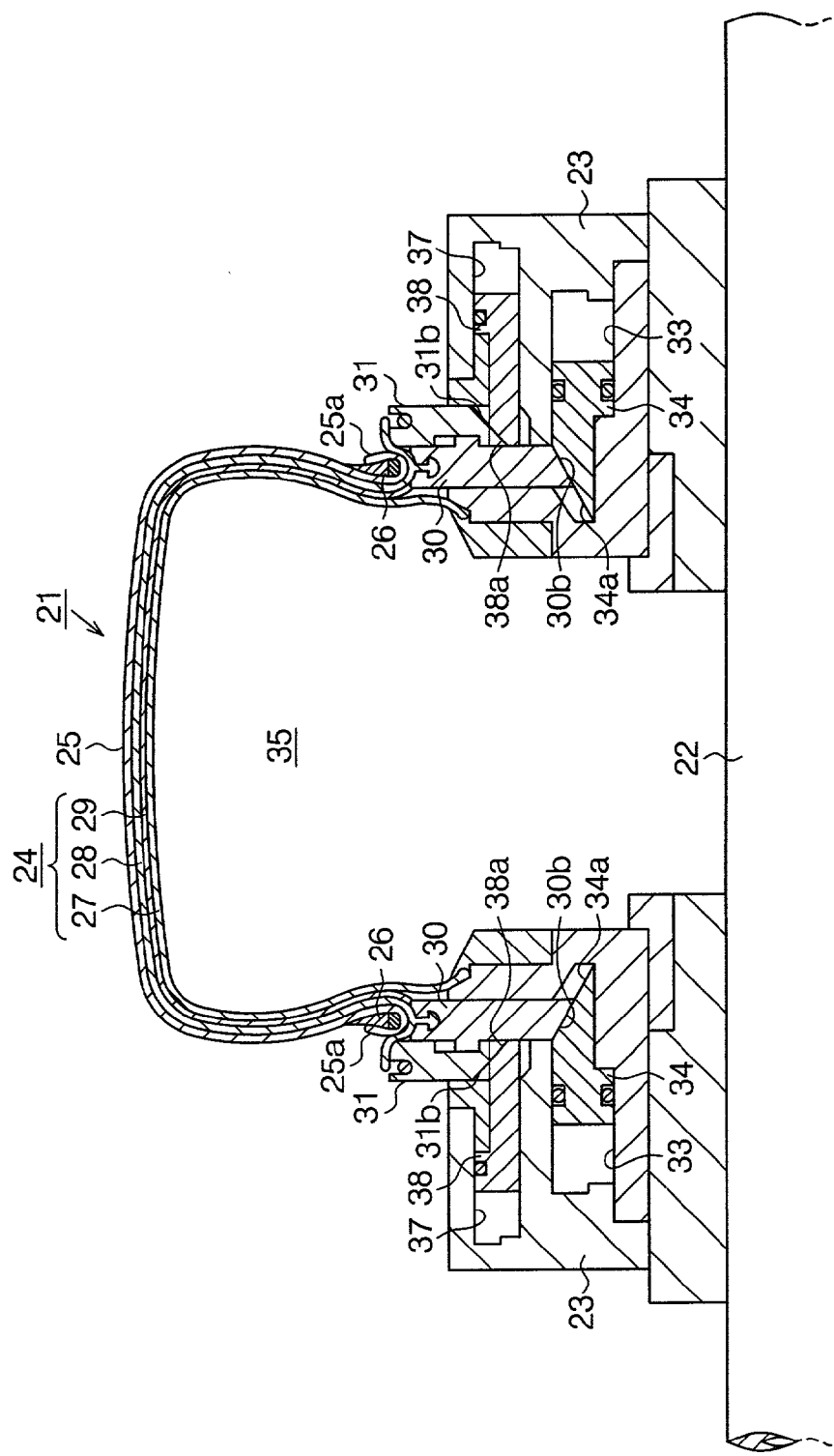
FIG. 5 is a partial cross-sectional view showing an operating state of the tire forming apparatus in FIG. 1.

Subsequently, as compressed air is supplied into the outer cylinder chamber 37, the outer piston 38 is moved toward the bending member 31, as shown in FIG. 5. Associated with this movement, each bending member 31 is protruded outward in the radial direction from the movable body 23 in cooperation of the inclined cam face 38a with the inclined surface 31b. The protruded bending member 31 bends over both crosswise end portions of the body ply 25. The portions of the body plies 25 thus bent over, i.e., the bent portions 25a wrap around the beads 26.

Even if the bent portions 25a are short, the bending member 31 made of a rigid body, when protruded, can securely erect and bend over both crosswise end portions of the body ply 25, thereby preventing the bent portions 25a from being wrinkled or hanging down. Therefore, as shown in FIG. 6, the bent portion 25a can be reduced in length to limit the height L1 of the edge 25b of the bent portion 25a to the height H or less of the rim flange 40a, for example, to approximately 10 mm from the proximal end of the rim flange 40a.

Figure 8:
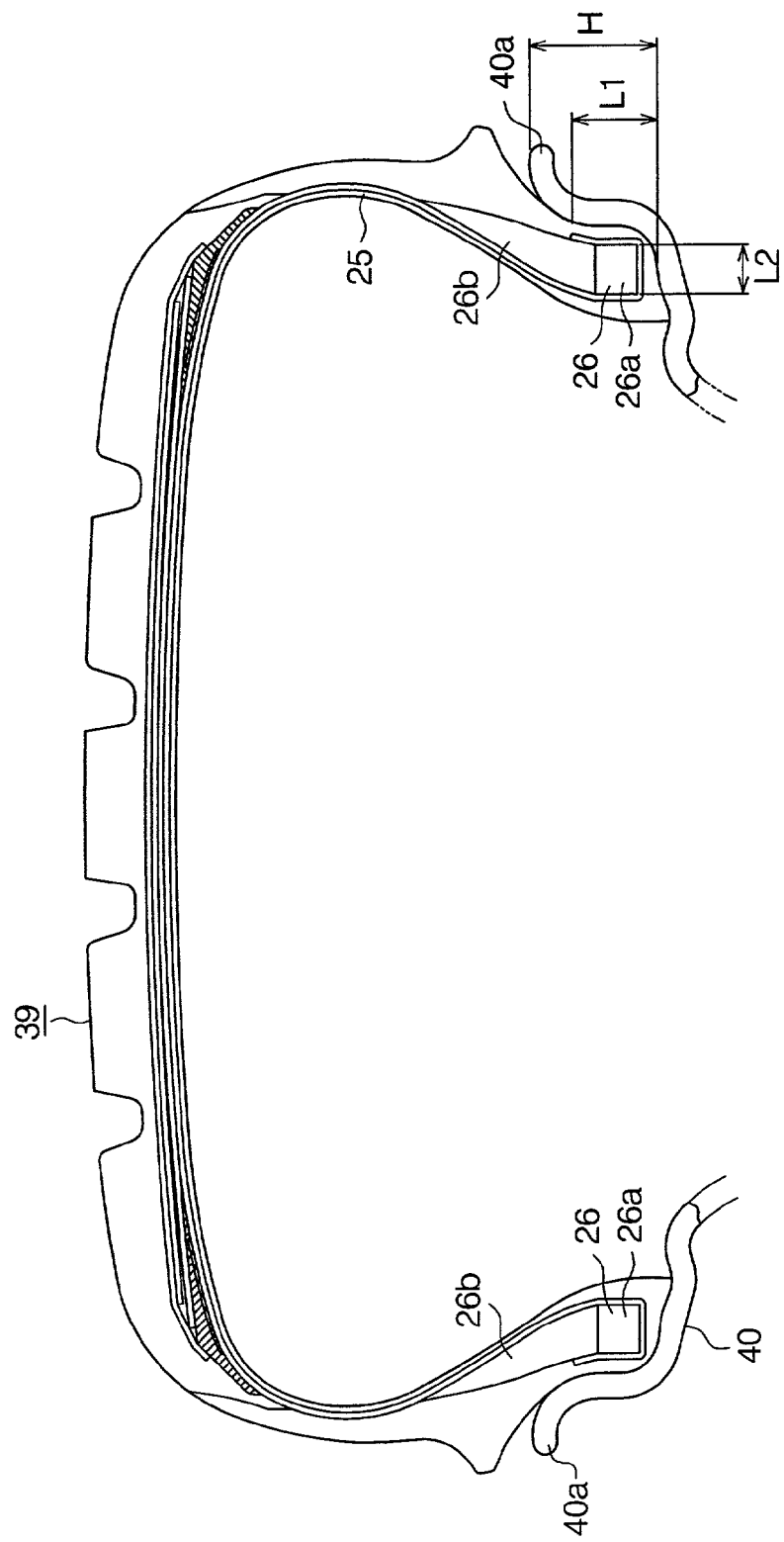
FIG. 8 is a cross-sectional view of a tire after vulcanization.

Subsequently, a belt, a tread rubber, and the like are sequentially adhered on the outer periphery of the toroidal body ply 25, or a previously adhered annular belt/tread assembly is fitted thereon. Next, a side wall rubber is wrapped on side surfaces of the body ply 25. In this way, the formation of a green tire before vulcanization is completed. Then, the green tire is vulcanized to complete the pneumatic tire 39 as shown in FIG. 8. L2 shown in FIG. 8 indicates the width of the bead core 26a.

When the green tire undergoes a vulcanization process, the tire increases in diameter, which causes the body ply 25 to slightly shift from the beads 26, so that the length of the bent portion 25a of the body ply 25 is designed allowing this shifting.

The foregoing embodiment has the following advantages.

The bending member 31 formed of a rigid body is moved outward in the radial direction of the body ply 25 to bend both crosswise end portions of the body ply 25 and disposes the beads 26 in the bent portions 25a. For this reason, even if the bent portions 25a are short, both crosswise end portions of the body ply 25 can be securely erected and bent without being wrinkled or hanging down. It is therefore possible to reduce the manufacturing cost and the weight of the tire.

Prior to bending both crosswise end portions of the body ply 25, the portions of the body ply 25 in which the beads 26 are disposed are pressed by the pressing members 30 outward in the radial direction, and these portions are brought into close contact with the bead cores 26a and bladder 24 so as not to slip off. Thus, when the crosswise end portions of the body ply 25 are bent, the positional relationship between the body ply 25 and the beads 26 is maintained in a correct positional relationship. Also, since the body ply 25 is bent only in portions close to the ends from the bead cores 26a, a portion of the body ply 25 between both beads 26 is not affected by the bending. Since both crosswise end portions of the body ply 25 are uniformly bent over mechanically by the bending members 31 made of rigid bodies, a uniform tire is formed without wrinkles.

The pressing members 30 are disposed in close proximity to the corresponding bending members 31, so that there is almost no gap between the pressing members 30 and the bending members 31. Therefore, both crosswise end portions of the body ply 25 can be clearly bent over without wrinkles with the body ply 25 securely held in close contact with the beads 26.

When the vulcanized tire 39 is mounted on the wheel rim 40, the height L1 of the edge 25b of the bent portion 25a is set at the height H of the rim flange 40a or lower, and preferably within one half or less of the height H of the rim flange 40a, as shown in FIG. 6. In other words, the edge 25b of the bent portion 25a is disposed within the bead portion 39a of the tire 39 mounted on the wheel rim 40. The bead portion 39a supported by the wheel rim 40 experiences small dynamic strains. Since the edge 25b susceptible to concentration of stress is disposed within the bead portion 39a having small dynamic strains, the tire is improved in strength and durability.

Figure 7:
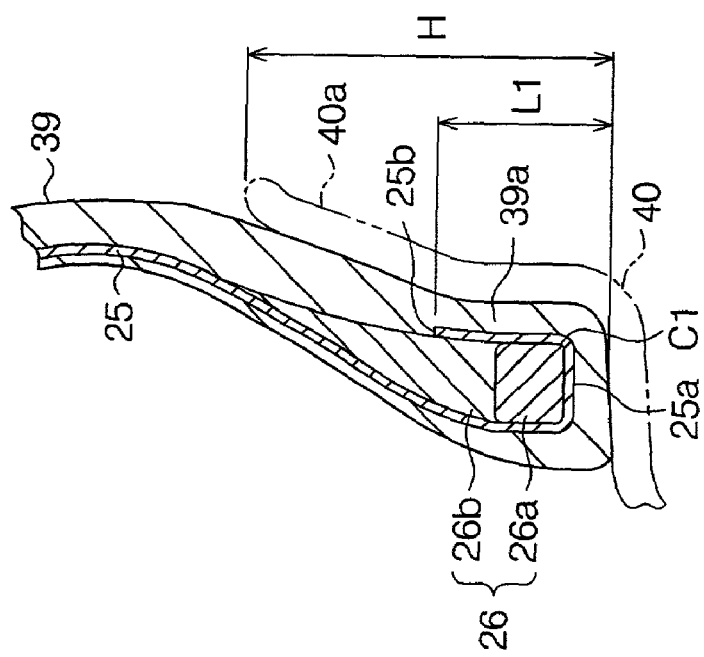
FIG. 7 is a partial cross-sectional view of another tire which is manufactured by the tire forming apparatus in FIG. 1.

Particularly, when the height L1 of the edge 25b of the bent portion 25a is set at approximately 10 mm from the proximal end of the rim flange 40a, preferably, a height not exceeding the bead core 26a as shown in FIG. 7, the ensured strength and durability of the tire can be balanced with a reduction in cost and weight at a high level. In FIG. 7, the height L1 of the edge 25b is substantially the same as the height of the bead cores 26a. In this structure, the height L1 of the edge 25b is, for example, in a range of 5 to 10 mm.

Next, a second embodiment of the present invention will be described with reference to FIGS. 9 to 10(b), mainly on differences between the second embodiment and the first embodiment shown in FIGS. 1 to 8.

Figure 9:
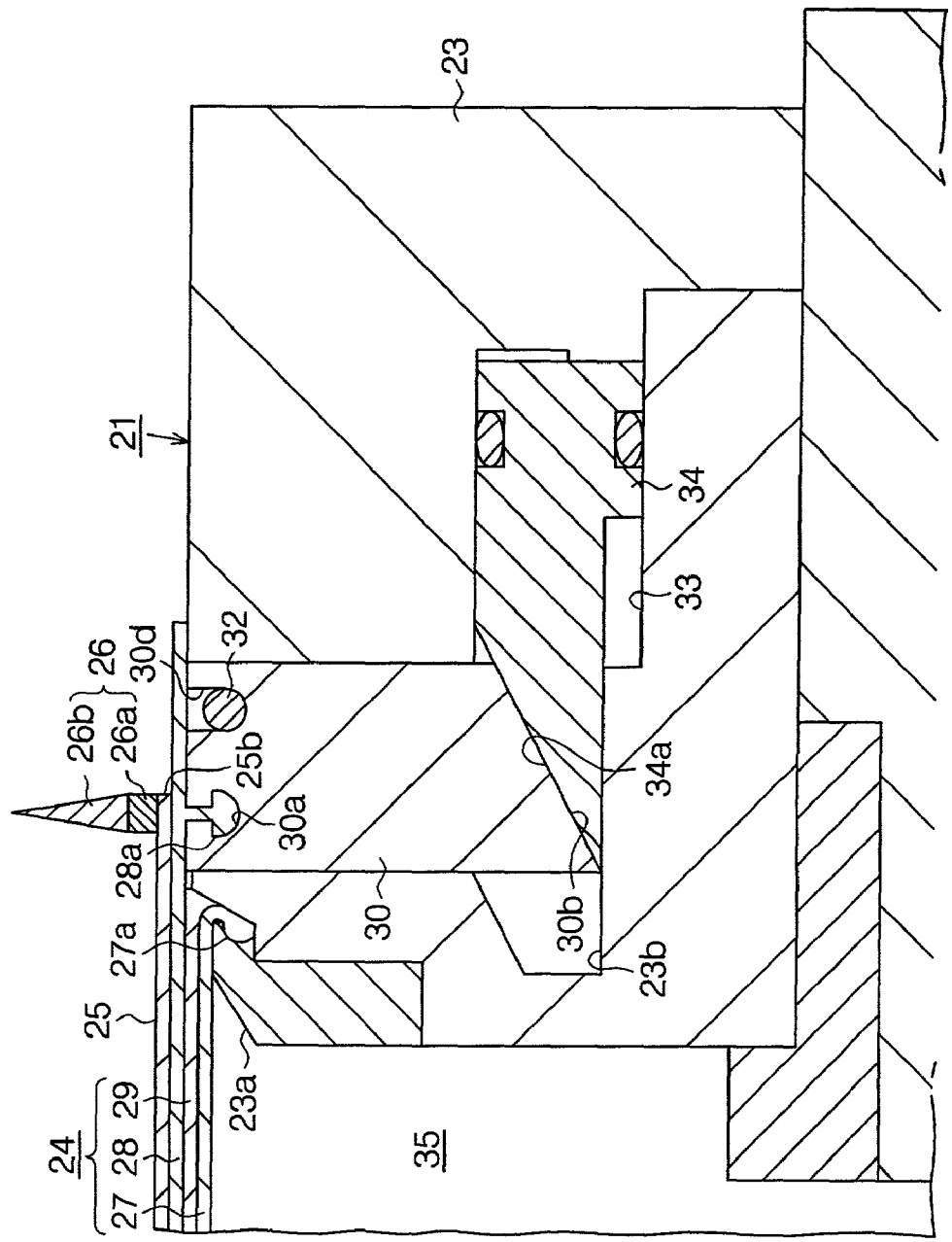
FIG. 9 is a partial cross-sectional view showing a tire forming apparatus in a second embodiment of the present invention.

As shown in FIG. 9, a tire forming apparatus 21 according to the second embodiment does not have the plurality of bending members 31 in the first embodiment, but only a plurality of the pressing members 30 received in the receiving recesses 23b of the movable bodies 23. Also, each pressing member 30 is formed with a stopping groove 30d at an outer end, and each pressing member 30 is urged toward a direction at which the pressing member 30 is fitted into the receiving recess 23b by a spring 32 hung at the stopping groove 30d. In addition, the outer cylinder chamber 37 and outer piston 38 in the first embodiment are also removed from the tire forming apparatus 21, and each movable body 23 is provided only with a cylinder chamber 33 and a piston 34 which correspond to the inner cylinder chamber 33 and inner piston 34, respectively, in the first embodiment.

Next, description will be made on the operation of the tire forming apparatus 21 according to the second embodiment.

First, in a manner similar to the first embodiment, the cylindrical body ply 25 is fitted on the outer peripheral surface of the bladder 24, with both movable bodies 23 spaced apart from each other, and the beads 26 are set near both edges 25b of the body ply 25. In this event, both edges 25b of the body ply 25 extend to positions corresponding to the pressing members 30. Also, both beads 26 are disposed at positions corresponding to the pressing members 30. Further, both edges 25b of the body ply 25 are positioned outside the center of the width of the bead cores 26a with respect to the axial direction of the body ply 25, and arranged so as not to go beyond the bead cores 26a.

Next, as compressed air is supplied to the cylinder chamber 33, the piston 34 is moved toward the pressing member 30. Associated with this movement, each pressing member 30 is protruded outward in the radial direction from the movable body 23 in cooperation of the inclined cam face 34a with the inclined surface 30b. The protruded pressing members 30 press portions of the body ply 25, on which the beads 26 are disposed, outward in the radial direction, and these portions are brought into close contact with the bead cores 26a and bladder 24 so as not to slip off.

At the same time compressed air is supplied to the cylinder chamber 33, compressed air is also supplied to the inner space 35 of the bladder 24. Together with this, both movable bodies 23 are moved in a direction in which they come closer to each other to narrow the spacing between both crosswise ends of the body ply 25. As a result, the bladder 24 is deformed outward in the radial direction, with an increase in the diameter of an intermediate portion in the axial direction of the body ply 25, resulting in deformation of the body ply 25 into a toroidal shape. Both crosswise end portions of the body ply 25 are maintained in close contact with the beads 26. Thus, both crosswise end portions of the body ply 25 are bent at positions corresponding to the bead cores 26*a*.

Figure 10:
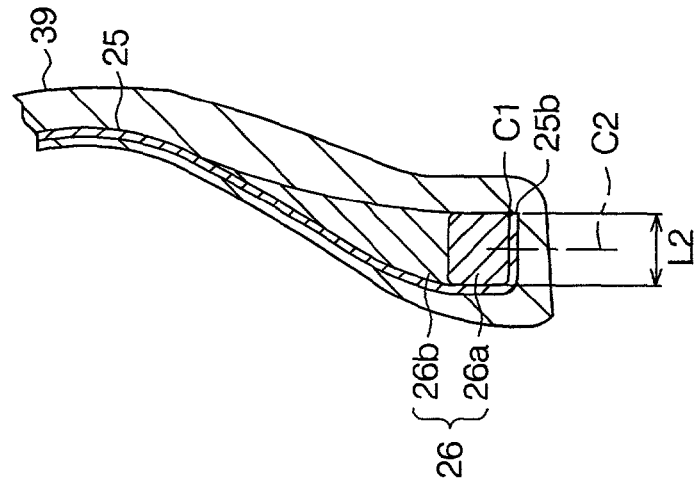
FIGS. 10(a) and 10(b) are partial cross-sectional views showing tires manufactured by the tire forming apparatus in FIG. 9.
Figure 10:
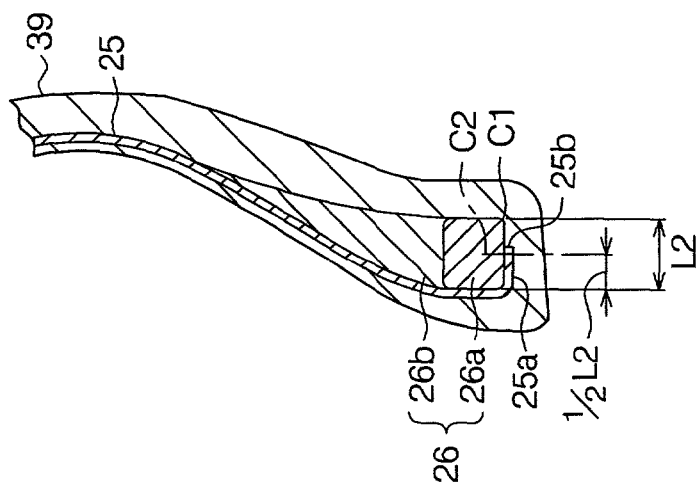

When a pneumatic tire 39 is formed using the body ply 25 formed in the foregoing manner, the tire 39 is provided as shown in FIGS. 10(*a*) or 10(*b*). Specifically, the edge 25*b* of the bent portion 25*a* of the body ply 25 is placed between a central position C2 of a width L2 of the bead core 26*a* and an outer end position C1 of the bead core 26*a* with respect to the axial direction of the tire 39. Therefore, a lighter tire 39 can be provided at a lower cost than the tire 39 of the first embodiment shown in FIGS. 1 to 8. Also, the bending members 31 in the first embodiment are not required, so that the tire forming apparatus can be simplified in configuration.

Next, a third embodiment of the present invention will be described with reference to FIGS. 11 to 13, mainly on differences between the third embodiment and the first embodiment shown in FIGS. 1 to 8.

Figure 11:
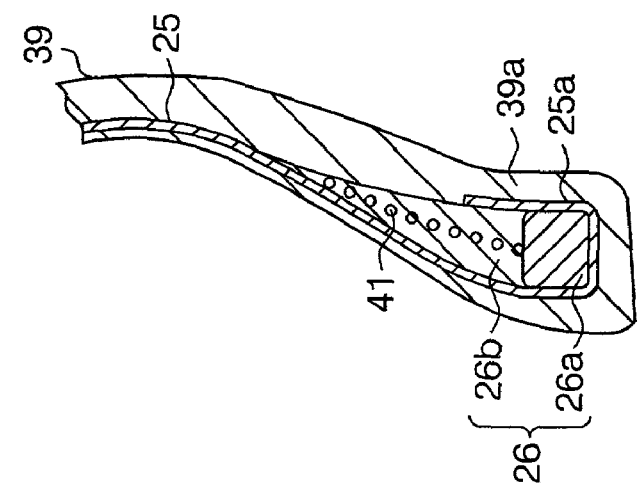
FIGS. 11, 12 and 13 are partial cross-sectional views of tires in a third embodiment of the present invention.
Figure 12:
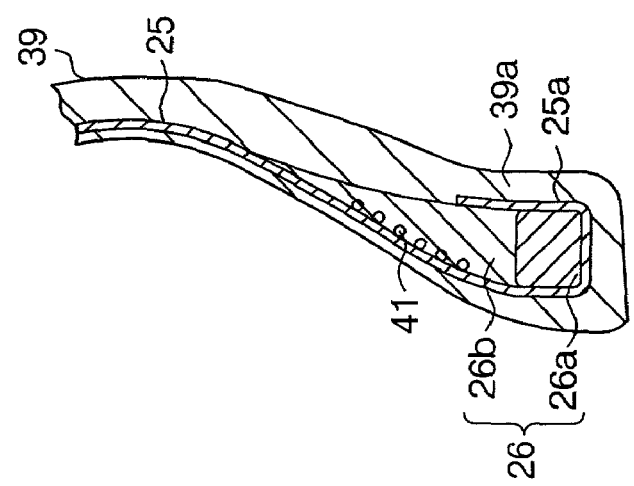
Figure 13:
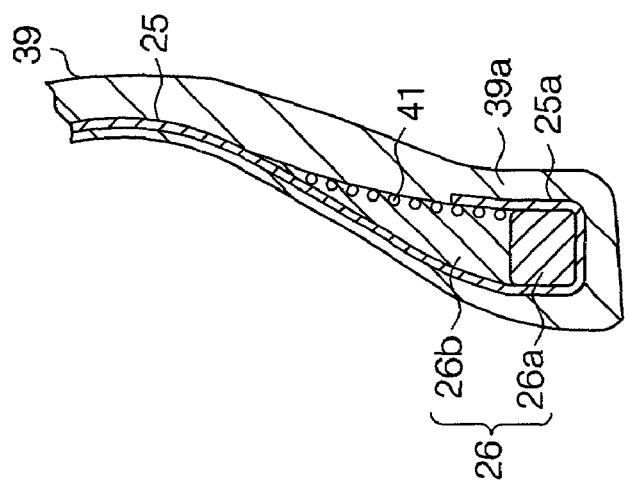

As shown in FIGS. 11 to 13, in the third embodiment, the bead filler 26*b* of the bead 26 is provided with a bead insert ply 41 for reinforcing the bead portion 39*a*. This bead insert ply 41 is fabricated by coating a rubber on a cord made of steel or organic fiber, and winding the rubber coated cord concentrically with the bead 26. The rubber coated cord is wound at a pitch of 3 to 25 in 25 mm.

In an example of FIG. 11, the bead insert ply 41 is disposed on the outer surface of the bead filler 26*b*. The bead insert ply 41 is previously attached to the bead filler 26*b* before the beads 26 are set on both crosswise end portions of the body ply 25. Also, the bead insert ply 41 extends outward in the radial direction of the tire 39 from a position at which it substantially comes into contact with the bead core 26*a*.

In an example of FIG. 12, the bead insert ply 41 is disposed on the inner surface of the bead filler 26*b*. Similar to the bead insert ply 41 in FIG. 11, the bead insert ply 41 is attached to the bead filler 26*b* before the beads 26 are set on both crosswise end portions of the body ply 25. However, an inner end in the radial direction of the bead insert ply 41 is slightly spaced from the bead core 26*a*.

In an example of FIG. 13, the bead insert ply 41 is disposed within the bead filler 26*b*. First, a pair of divided pieces, making up the bead filler 26*b* are provided. After the bead insert ply 41 is attached to one divided piece, both divided pieces are integrated such that the bead insert ply 41 is sandwiched there between to form the bead filler 26*b*. The bead filler 26*b* which contains the bead insert ply 41 is combined with the bead core 26*a*.

By forming the tire 39 using the bead 26 shown in FIGS. 11 to 13, the bead portion 39*a* of the tire 39 is improved in rigidity to stabilize the vehicle while it is running.

Alternatively, in the example of FIG. 11, the bead insert ply 41 may be disposed outside the bent portion 25*a* of the body ply 25. In this case, the bead insert ply 41 is attached to the bent portion 25*a* after the body ply 25 has been bent.

Also, the bead insert plies 41 shown in FIGS. 11 to 13 may be provided in the bead 26 of the tire 39 shown in FIG. 10(*a*) or 10(*b*).

Next, a fourth embodiment of the present invention will be described with reference to FIGS. 14 to 26.

Figure 14:
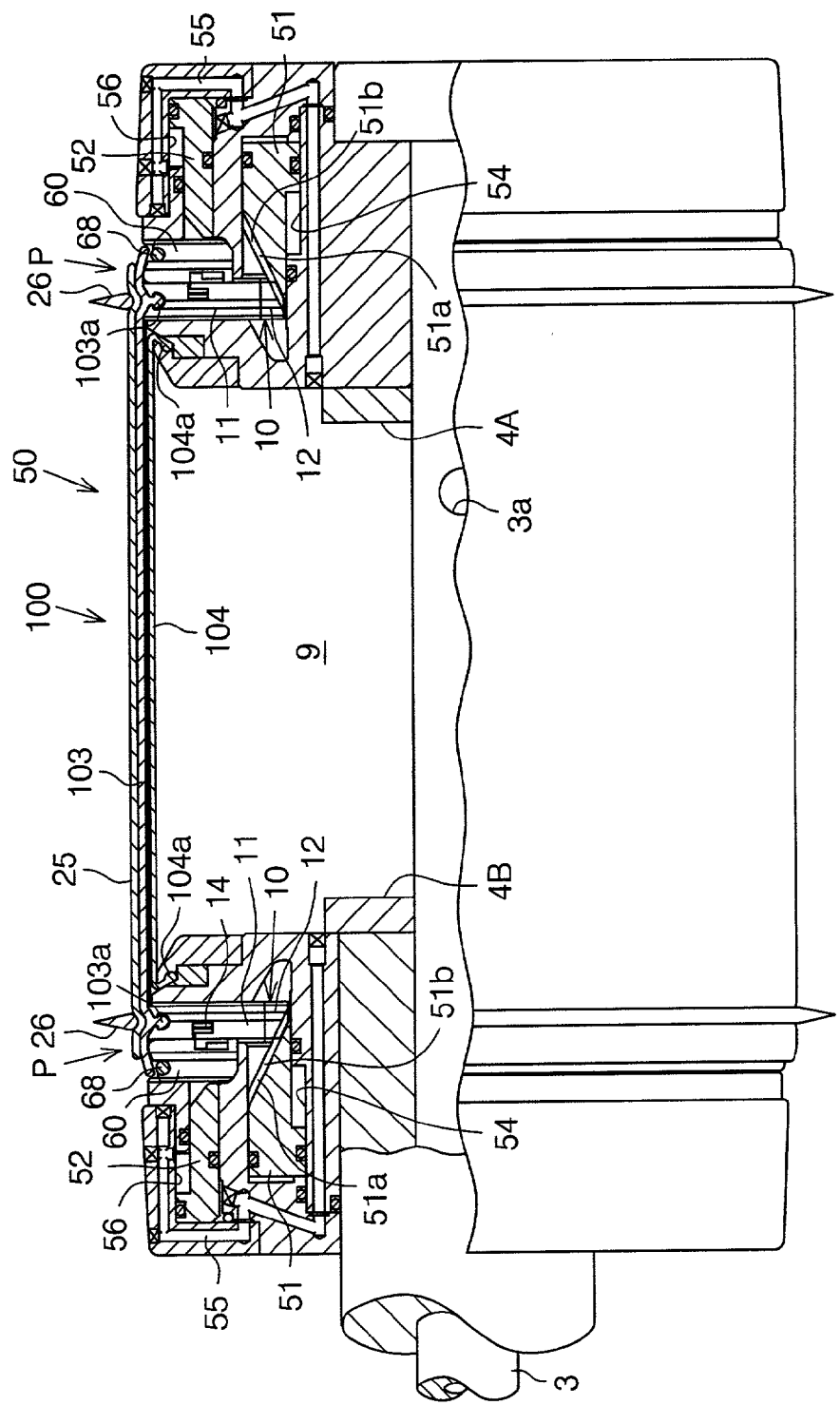
FIG. 14 is a partially broken front view showing a tire forming apparatus in a fourth embodiment of the present invention.

FIG. 14 shows a tire forming apparatus 50 in the fourth embodiment. This tire forming apparatus 50 forms, for example, a 17-inch radial tire. The tire forming apparatus 50 comprises a pipe-shaped operating shaft 3; and a pair of annular right and left movable bodies 4A, 4B supported on the operating shaft 3. One movable body 4B can be moved closer to and away from the other movable body 4A along the axial line of the operating shaft 3 by driving means, not shown. Alternatively, both movable bodies 4A, 4B may be moved closer to and away from each other.

A bladder 100 is extended between both movable bodies 4A, 4B. Between both movable bodies 4A, 4B, an inner space 9 is formed within the bladder 100.

Each of the movable bodies 4A, 4B has an annular outer cylinder chamber 56, and an annular inner cylinder chamber 54 disposed inside the outer cylinder chamber 56 in the radial direction. Each of the outer cylinder chambers 56 is connected to the inner space 9 and to a compressed air supply unit, not shown, through an air line 55 formed in the corresponding movable body 4A or 4B. An annular stepped outer piston 52 is contained in each outer cylinder chamber 56 for movement along the axial line of the operating shaft 3. An inclined cam face is formed on an inner peripheral surface of the outer piston 52.

Each of the inner cylinder chambers 54 is also connected to the inner space 9 and to the compressed air supply unit, not shown, through an air line (not shown) formed in the corresponding movable body 4A or 4B. An annular stepped inner piston 51 is contained in each inner cylinder chamber 54 for movement along the axial line of the operating shaft 3. The inner piston 51, which is an annular member, has an inclined cam face 51*a* on its inner peripheral surface. On the inclined cam face 51*a* are formed a plurality of recesses 51*b* in a groove shape at predetermined angular intervals.

The operating shaft 3 is formed with an air hole 3*a* in communication with the inner space 9 through the peripheral surface. The air hole 3*a* is connected to the air supply unit, not shown, through an air path formed in the operating shaft 3. The air hole 3*a* functions as a supply port for supplying the inner space 9 with compressed air as a pressure medium, and as a discharge port for discharging the compressed air from the inner space 9.

Figure 15:
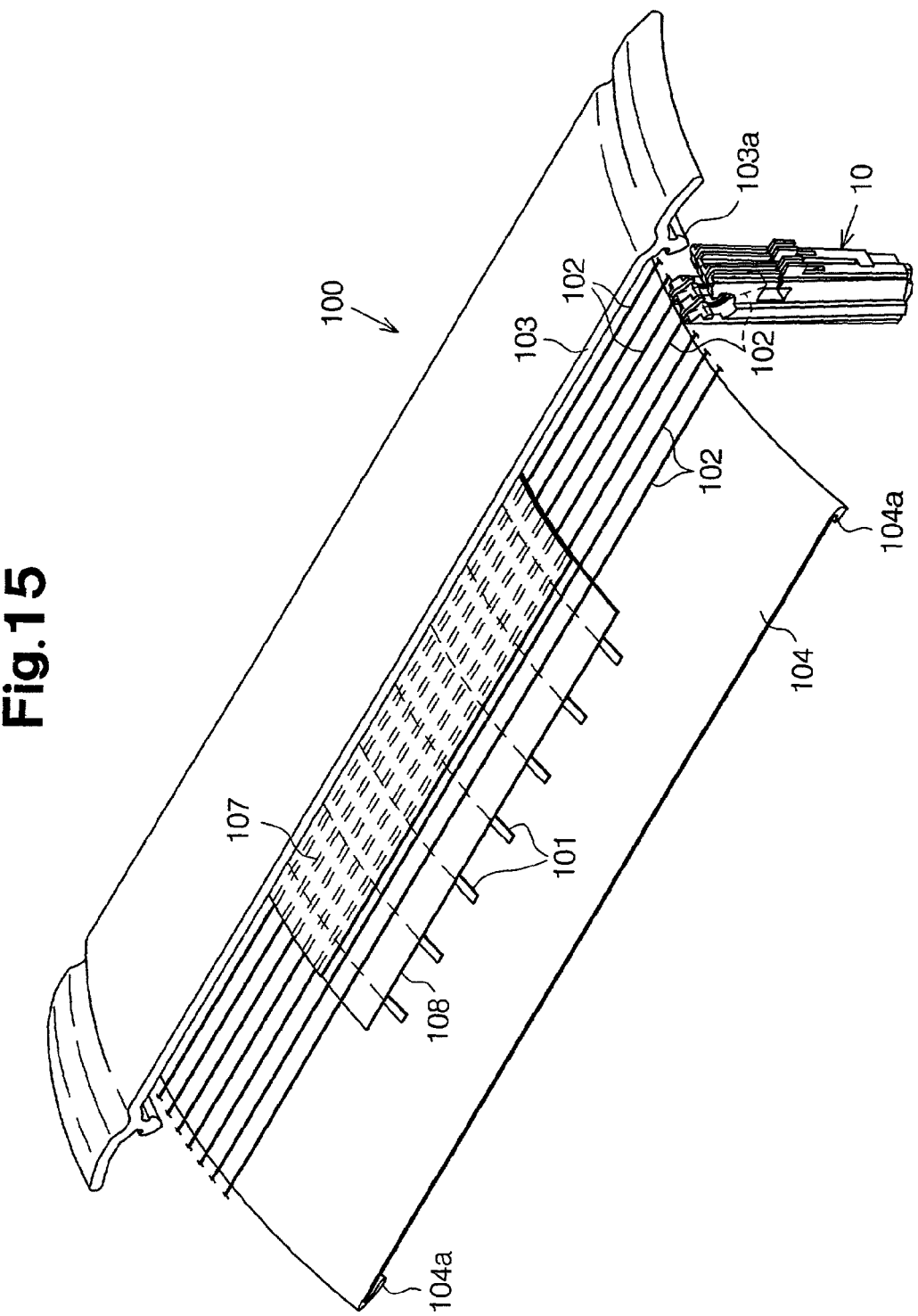
FIG. 15 is a partially broken perspective view of a bladder for use in the tire forming apparatus in FIG. 14.

As shown in FIG. 15, a bladder 100 comprises a cylindrical outer elastic material 103; a cylindrical inner elastic material 104; and a cylindrical core material disposed between both elastic materials 103, 104.

The core material includes a strip-shaped first linear material 101 extending in the circumferential direction of the bladder 100; and a second linear material 102 extending in the axial direction of the bladder 100 orthogonal to the first linear material 101. A material having a high tensile strength, for example, an aramid fiber is used as these linear materials. The second linear material 102, which is a single linear material, is bent at both ends of the bladder 100 such that the portion of the adjacent second linear material 102 is continuous thereto. A cloth material 108 is provided between the first linear material 101 and the second linear material 102 for preventing disturbance in the arrangement of the first linear material 101 and second linear material 102, as shown in FIG. 15.

The outer elastic material 103 is disposed outside the second linear material with the cloth material 107 in between for preventing disturbance in the arrangement of the second linear material 102. Annular coupling protrusions 103*a* are formed on the inner peripheral surfaces of both axial end portions of the outer elastic material 103. Both end portions in the axial direction of the inner elastic material 104 are bent over inward, and annular mount protrusions 104*a* are formed at the extreme distal ends of the bent portions. The mount protrusions 104*a* are fitted into the corresponding movable bodies 4A, 4B (see FIG. 14). The inner elastic material 104 prevents compressed air supplied into the inner space 9 from leaking outside the inner space 9.

Figure 16:
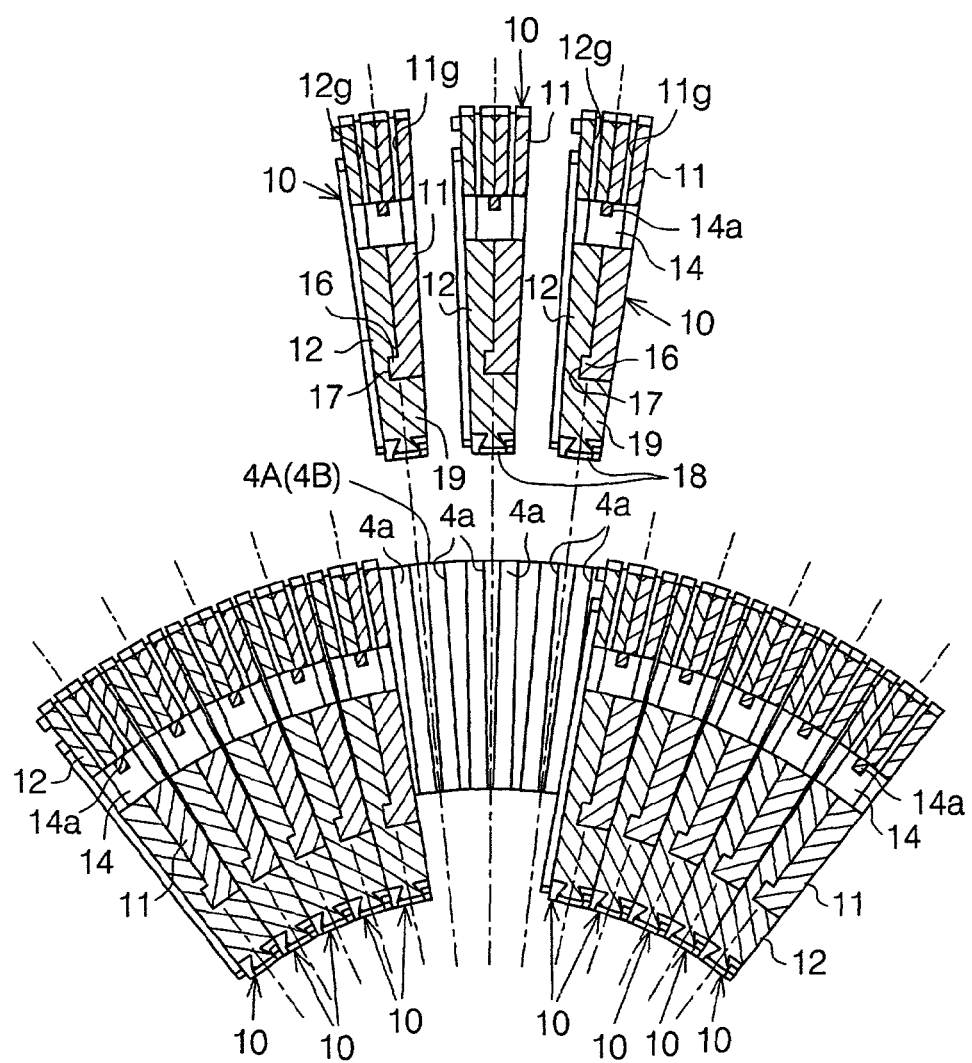
FIG. 16 is a partially enlarged cross-sectional view showing the arrangement of a pawl member provided in the tire forming apparatus in FIG. 14.

As shown in FIGS. 14 and 16, a plurality of pawl member assemblies P are supported by the respective movable bodies 4A, 4B such that they are generally formed in a ring shape, when viewed from the axial direction of the operating shaft 3. These pawl member assemblies P are movable in the radial direction with respect to the corresponding movable bodies 4A, 4B. Each of the movable bodies 4A, 4B is formed with an annular receiving recess on the outer peripheral surface for receiving the pawl member assembly P. Each pawl member assembly P includes a pressing member 10 corresponding to the pressing member 30 in the embodiment in FIGS. 1 to 8; and a pair of bending members 60 corresponding to the bending members 31 in the embodiment in FIGS. 1 to 8. The pressing member 10 and bending members 60 are made of rigid bodies such as a hard synthetic resin.

As shown in FIGS. 17 to 20, each pressing member 10 has a first divided piece 11 and a second divided piece 12 which are divided in the circumferential direction of the movable bodies 4A, 4B. The first divided piece 11 and second divided piece 12 have shapes different from each other in inner portions (on the lower side in FIG. 20), but have the same shape as each other in outer portions (on the upper side in FIG. 20).

The first divided piece 11 has a cut groove 11a in communication with the outside through a slot 11b. The divided piece 11 also has an inclined groove 11g in communication with the cut groove 11a. A pair of protrusions 11d is disposed in an upper region on one side surface of the first divided piece 11 such that they are positioned on both sides of the inclined groove 11g. Likewise, the second divided piece 12 has a cut groove 12a in communication with the outside through a slot 12b, and an inclined groove 12g in communication with the cut groove 12a. A pair of protrusions 12d is disposed in an upper region on one side surface of the second divided piece 12 such that they are positioned on both sides of the inclined groove 12g.

Figure 17:
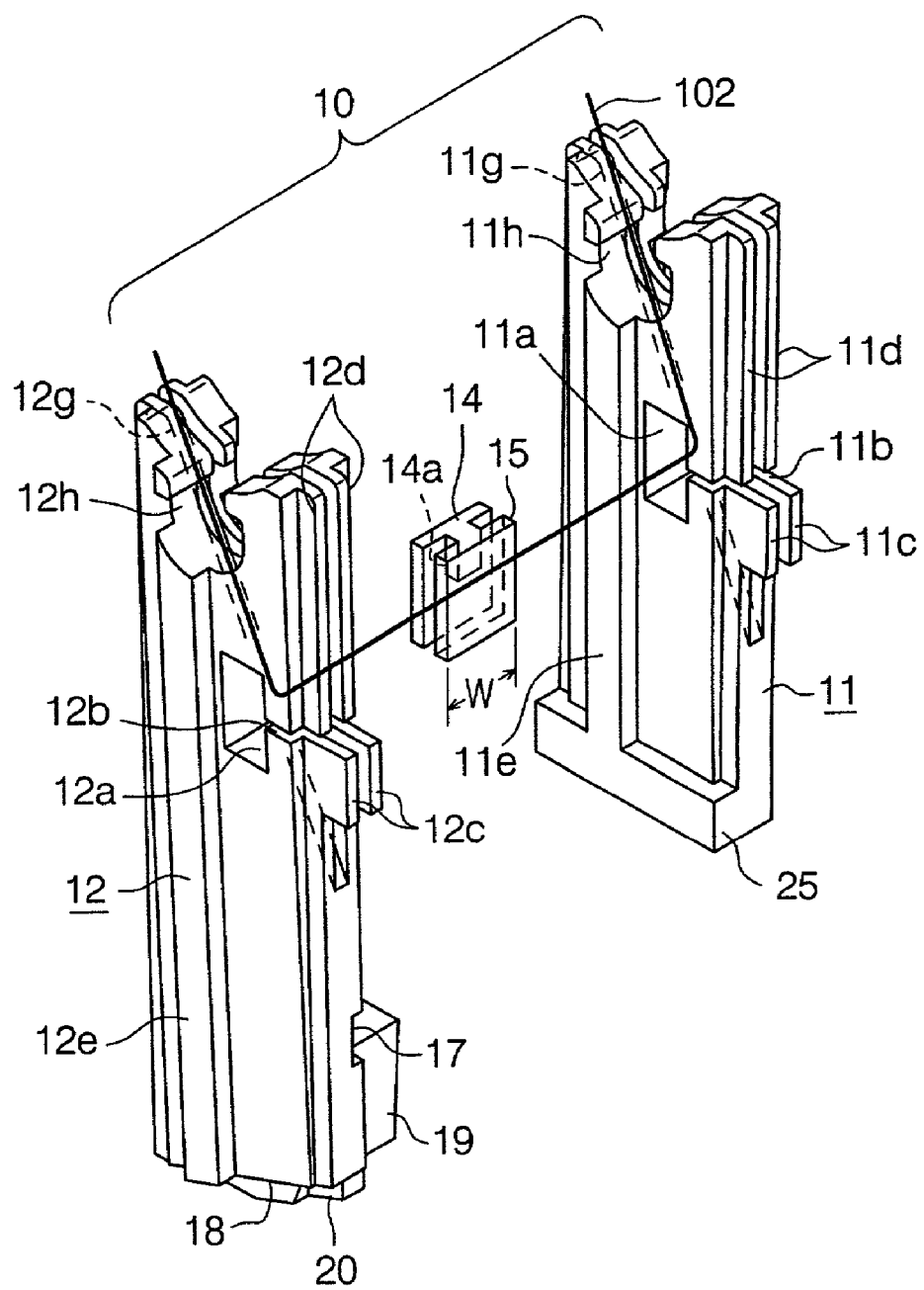
FIG. 17 is an exploded perspective view of a pressing member in the pawl member of FIG. 16.

As shown in FIG. 17, bent portions of the second linear material 102 of the bladder 100 are introduced into the inclined grooves 11g, 12g, and also introduced into the cut grooves 11a, 12a through the slots 11b, 12b.

A pair of engaging protrusions 11c is disposed on one side surface of the first divided piece 11 such that they are positioned on both sides of the inclined groove 11g. The engaging protrusion 11c is positioned on the opposite side of the protrusion 11d beyond the slot 11b, and protrudes more than the protrusion 11d. A pair of engaging protrusions 12c is disposed on one side surface of the second divided piece 12 such that they are positioned on both sides of the inclined groove 12g. The engaging protrusion 12c is positioned on the opposite side of the protrusion 12d beyond the slot 12d, and protrudes more than the protrusion 12d.

Figure 18:
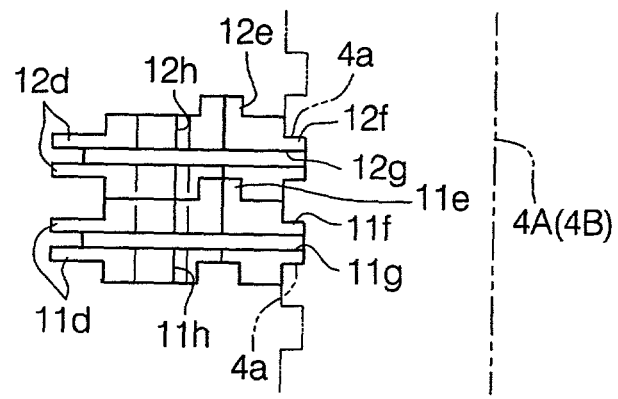
FIG. 18 is a plan view of the pressing member.
Figure 19:
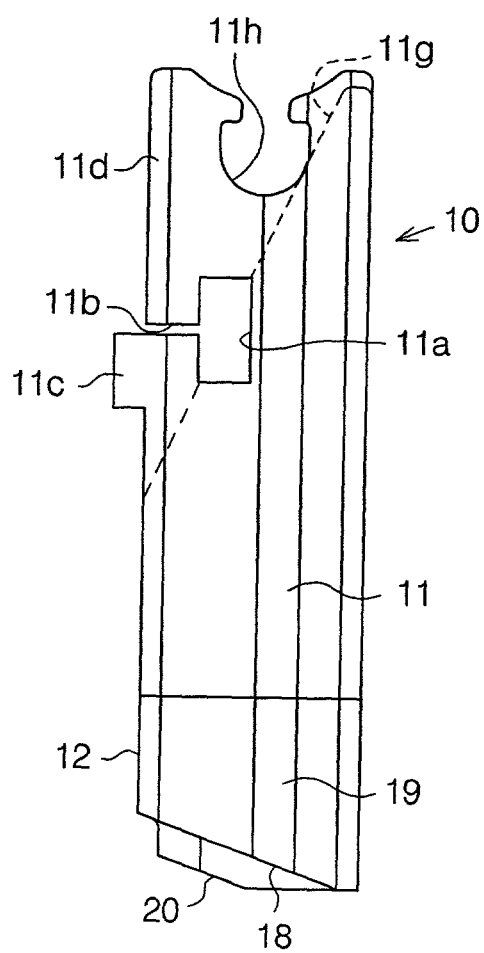
FIG. 19 is a front view of the pressing member.

As shown in FIGS. 17 and 19, semi-circular coupling recesses 11h, 12h are formed on upper edges of the first and second divided pieces 11, 12, respectively, such that the coupling protrusions 103a of the bladder 100 are fitted thereinto. As shown in FIGS. 17 to 19, the first divided piece 11 has a protrusion lie in engagement with the second divided piece 12. The second divided piece 12 has a protrusion 12e in engagement with the first divided piece 11 of the other adjacent pawl member assembly P. As shown in FIG. 18, the first and second divided pieces 11, 12 have guide protrusions 11f, 12f which are in engagement with guide grooves 4a formed in the inner walls of the receiving recesses of the corresponding movable bodies 4A, 4B.

Figure 20:
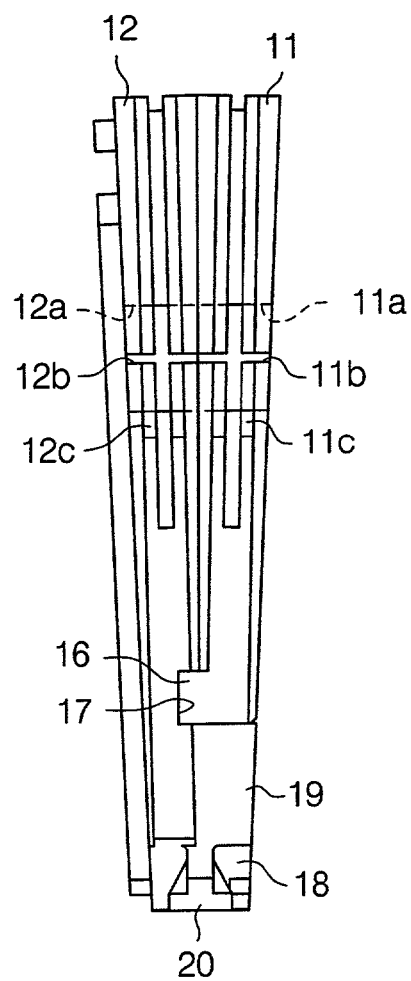
FIG. 20 is a side view of the pressing member.

As shown in FIGS. 17, 19 and 20, the first divided piece 11 is shorter than the second divided piece 12. A protrusion 16 is provided in a lower end portion of the first divided piece 11, while a recess 17, into which the protrusion 16 is fitted, is formed in the second divided piece 12. In the lower portion of the second divided piece 12 is formed a flange 19 which extends toward the first divided piece 11. When both divided pieces 11, 12 are engaged with each other, an end face of the flange 19 is coplanar with the outer surface of the first divided piece 11 (see FIG. 20). As shown in FIG. 19, the second divided piece 12 is formed with an inclined surface 18 in a lower end portion for engagement with an inclined cam face 51a of the inner piston 51. A guide 20 is protrusively formed at the center of the inclined surface 18, as shown in FIG. 20. The guide 20 is slidably fitted into a recess 51b on the inclined cam face 51a.

Figure 21:
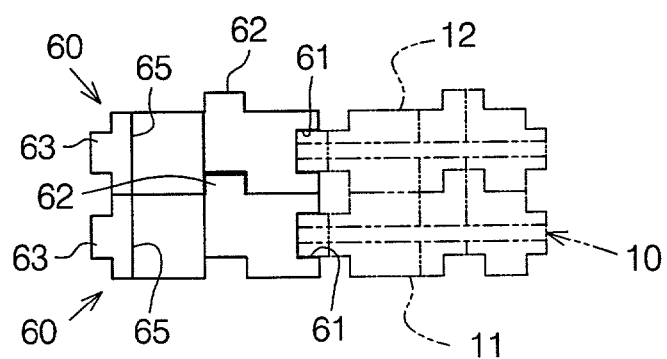
FIG. 21 is a plan view of a bending member.

As shown in FIGS. 21 to 23, each of the bending members 60 corresponds to each of the first and second divided pieces 11, 12 of the pressing member 10. FIG. 21 shows a pair of bending members 60 each corresponding to each of the divided pieces 11, 12 of the pressing member 10, while FIGS. 22 and 23 show one bending member 60. Each bending member 60 has engaging recesses 66 in engagement with a pair of engaging protrusions 11c, 12c which are formed on the corresponding divided pieces 11, 12. With respect to the radial direction of the movable bodies 4A, 4B, the engaging recesses 66 are longer than the corresponding engaging protrusions 11c, 12c. Therefore, the bending members 60 are movable in the radial directions of the movable bodies 4A, 4B with respect to the corresponding divided pieces 11, 12.

Each bending member 60 has guide grooves 61 in engagement with a pair of protrusions lid formed on the corresponding divided pieces 11, 12. Also, each bending member 60 has protrusions positioned opposite to the guide grooves 61. Though not particularly shown, the protrusions 63 are engaged with guide grooves formed in the inner walls of the receiving recesses of the corresponding movable bodies 4A, 4B.

Each bending member 60 has an engaging protrusion 62 in engagement with the other bending member 60 adjacent thereto. Each bending member 60 is formed with an inclined surface 64 in a lower end portion for engagement with the inclined cam face of the outer piston 52. Each bending member 60 is formed with a stopping groove 65 in an upper end portion. Annular springs 68 (see FIG. 14) are hung by the stopping grooves 65 of a plurality of the bending members 60 supported by the respective movable bodies 4A, 4B. The springs 68 urge the bending members 60 inward in the radial directions of the corresponding movable bodies 4A, 4B.

As shown in FIGS. 17 and 24, an insert barrel 14 made of a hard synthetic resin is disposed between both divided pieces 11, 12 of the pressing member 10. The insert barrel 14 has a pair of rectangular thin plates having a width W; and a support 14a for coupling both thin plates. The length of the support 14a in the vertical direction in FIG. 24 is represented by L3. The insertion barrel 14 has a pair of grooves 15 positioned on both sides of the support 14a.

The insert barrel 14 is inserted into the cut groove 11a of the first divided piece 11, and the cut groove 12a of the second divided piece 12. The width W of the thin plates of the insert barrel 14 is set to a shortest possible dimension as long as the strength of the insert barrel 14 can be sufficiently ensured. In the fourth embodiment, the size of the insert barrel 14 is approximately 10 mm×11 mm×5 mm. Also, in the fourth embodiment, a total number of the insert barrels 14 is approximately 150 for each of the movable bodies 4A, 4B.

As shown in FIG. 17, the bent portions of the second linear material 102 of the bladder 100 are supported by the supports 14a of the insert barrels 14, in the state where they are introduced into the inclined grooves 11g, 12g of both divided pieces 11, 12, respectively. A plurality of insert barrels 14, different in the length L3 from one another, is previously provided (see FIG. 24), from which insert barrels to be used are selected as appropriate.

Next, the operation of the tire forming apparatus 50 according to the fourth embodiment will be described with reference to FIGS. 14, 25 and 26. The operation of the tire forming apparatus 50 according to the fourth embodiment is substantially similar to the operation of the tire forming apparatus 21 in the first embodiment in FIGS. 1 to 8.

As shown in FIG. 14, the cylindrical body ply 25 is first fitted on the outer peripheral surface of the bladder 100, with both movable bodies 4A, 4B spaced away from each other, and beads 26 are set on both crosswise end portions of the body ply 25. The body ply 25 and beads 26 are the same as those in the first embodiment. Both crosswise end portions of the body ply 25 extend to positions corresponding to the bending members 60 beyond the pressing members 10, respectively. Also, both beads 26 are disposed at positions corresponding to the pressing members 10, respectively. The inner and outer pistons 51, 52 are placed at retracted positions, and a plurality of the pressing members 10 and bending members 60 are fitted in the corresponding movable bodies 4A, 4B by urging forces of the springs 68.

Figure 25:
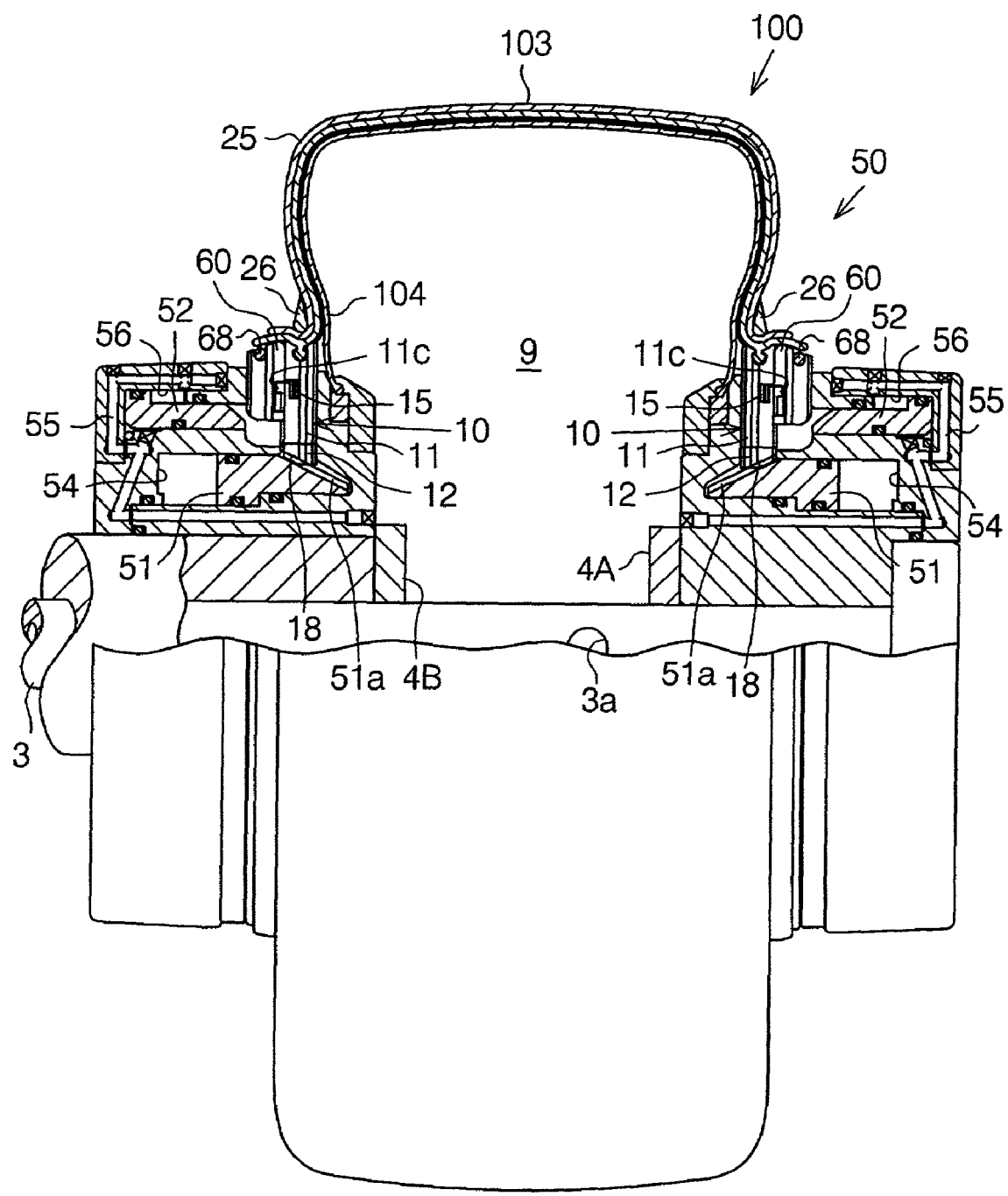
FIG. 25 is a partially broken front view showing an operating state of the tire forming apparatus in FIG. 14.

Next, as compressed air is supplied into the inner cylinder chamber 54, the inner piston 51 is moved toward the pressing member 10, as shown in FIG. 25. Associated with this movement, each pressing member 10 is protruded outward in the radial direction from a corresponding movable body 4A, 4B in cooperation of the inclined cam face 51a with the inclined face 18. The protruded pressing members 10 press portions of the body ply 25, in which the beads are disposed, outward in the radial direction to bring the portions into close contact with the beads 26 and bladder 100 so as not to slip off.

At the same time compressed air is supplied to the inner cylinder 54, compressed air is also supplied into the inner space 9 of the bladder 100 from an air hole 3a. Together with this, the movable body 4B is moved toward the movable body 4A to narrow the spacing between both crosswise ends of the body ply 25. As a result, the bladder 100 is deformed toward the outside in the radial direction, with an increase in the diameter of an axial intermediate portion of the body ply 25, resulting in deformation of the body ply 25 into a toroidal shape, as shown in FIG. 25. Both crosswise end portions of the body ply 25 are bent at positions corresponding to the bead cores 26a.

The bending member 60 is moved integrally with the pressing member 10. This movement brings the inclined surface 64 of the bending member 60 to a position at which it can be engaged with the inclined cam face of the outer piston 52.

Figure 26:
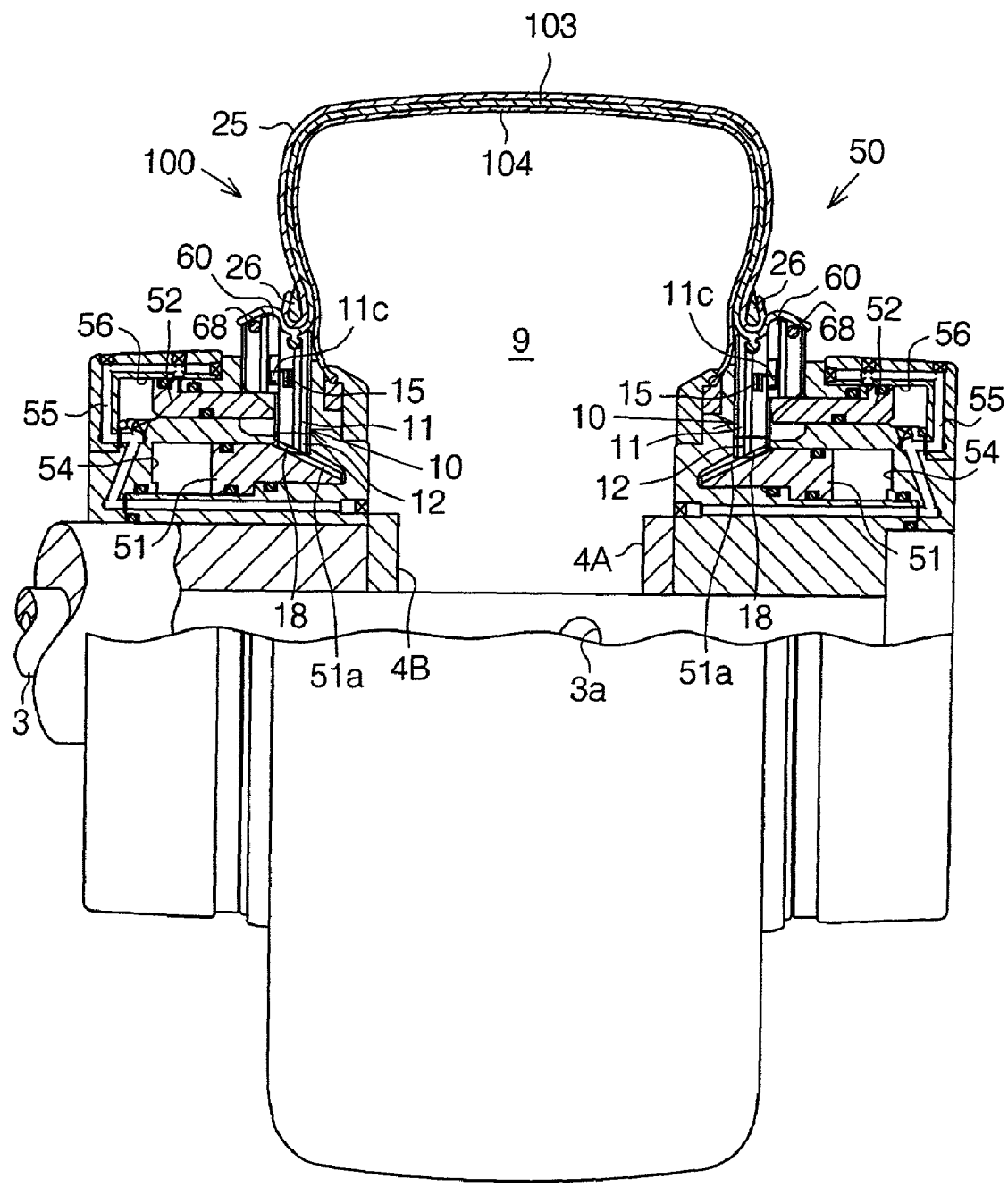
FIG. 26 is a partially broken front view showing an operating state of the tire forming apparatus in FIG. 14.

Subsequently, as compressed air is supplied to the outer cylinder chamber 56, the outer piston 52 is moved toward the bending member 60, as shown in FIG. 26. Associated with this movement, each bending member 60 is protruded outward in the radial direction from a corresponding movable body 4A, 4B in cooperation of the inclined cam face with the inclined surface 64. The protruded bending member 60 bends over both crosswise end portions of the body ply 25. The portions of the body ply 25 which have been bent over, i.e., bent portions wrap around the beads 26.

Subsequently, the compressed air within the inner space 9 is exhausted through the air hole 3a. The compressed air within the outer cylinder chamber 56 is also exhausted through an air line 55, inner space 9 and air hole 3a. Consequently, the outer piston 52 is moved in a direction in which it is away from the bending member 60. Associated with this movement, the bending members 60 are moved inward in the radial direction of the corresponding movable bodies 4A, 4B by urging forces of the springs 68. Subsequently, the compressed air is exhausted from the inner cylinder chamber 54, causing the inner piston 51 to move in a direction in which it is away from the pressing member 10. Associated with this movement, the bending members 60 and pressing members 10 are integrally moved inward in the radial directions of the corresponding movable bodies 4A, 4B by urging forces of the springs 68. Then, the body ply 52 formed into a toroidal shape is removed from the tire forming apparatus 50 which in turn is returned to the state shown in FIG. 14.

Subsequently, in a manner similar to the first embodiment in FIGS. 1 to 8, a tire is formed using the body ply 25 formed in a toroidal shape.

The foregoing fourth embodiment also has similar advantages to the first embodiment in FIGS. 1 to 8.

In the respective embodiments in FIGS. 1 to 26, the pressing members 10, 30 and bending members 31, 60 may be moved by a mechanical driving device such as a hydraulic cylinder device, an electromagnetic solenoid, or the like.

In the respective embodiments in FIGS. 1 to 26, instead of moving the pressing members 10, 30 and bending members 31, 60 by a cam action, these members 10, 30, 31, 60 may be directly coupled to a driving device.

Next, a fifth embodiment of the present invention will be described with reference to FIGS. 27 to 36. The fifth embodiment mainly relates to a body ply and its manufacturing.

Figure 27:
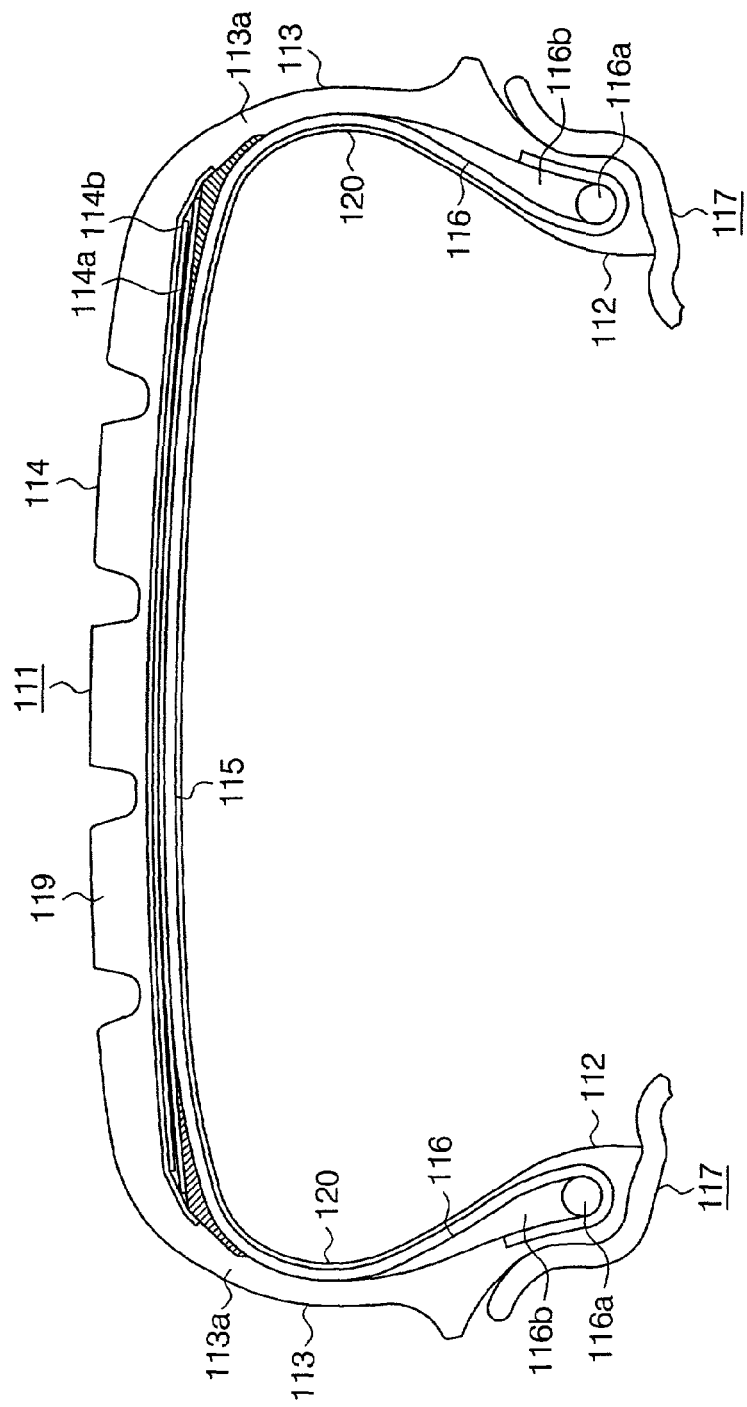
FIG. 27 is a cross-sectional view of a tire in a fifth embodiment of the present invention.

As shown in FIG. 27, a tire 111 in the fifth embodiment comprises a tread 114; a pair of side walls 113 extending inward in the radial direction of the tire 111 from both edges of the tread 114; and a pair of bead portions 112 mounted on a wheel rim 117. A body ply 115 which forms the skeleton of the tire 111 is distributed over the whole interior of the tire 111. A bead 116 made up of a bead core 116a and a bead filler 116b is disposed in each bead portion 112. A side wall rubber 113a is provided for each side wall 113. The tread 114 is provided with a tread rubber 119 and two belts 114a, 114b. An inner liner 120 is disposed inside the tire 111.

Figure 28:
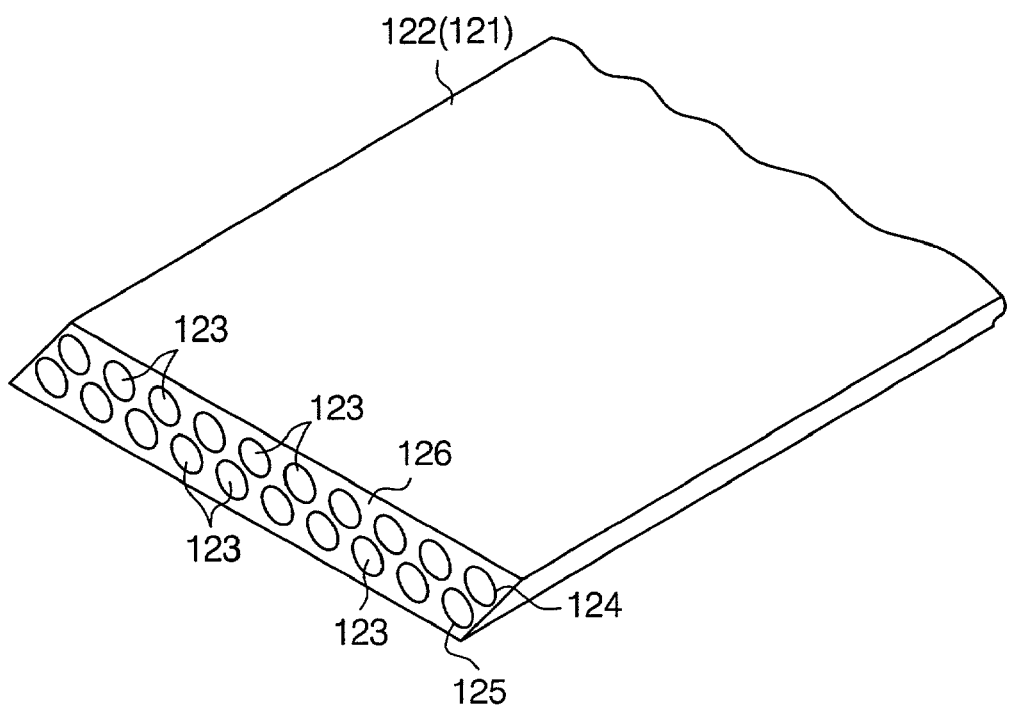
FIG. 28 is a partial perspective view of a ribbon which forms part of a body ply in the tire of FIG. 27.
Figure 29:
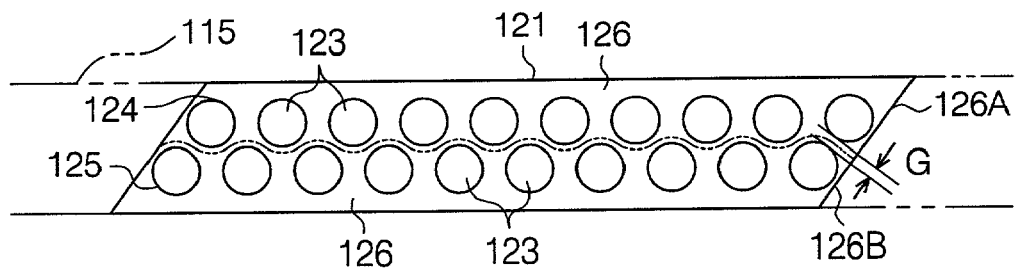
FIG. 29 is a cross-sectional view of the ribbon in FIG. 28.
Figure 30:
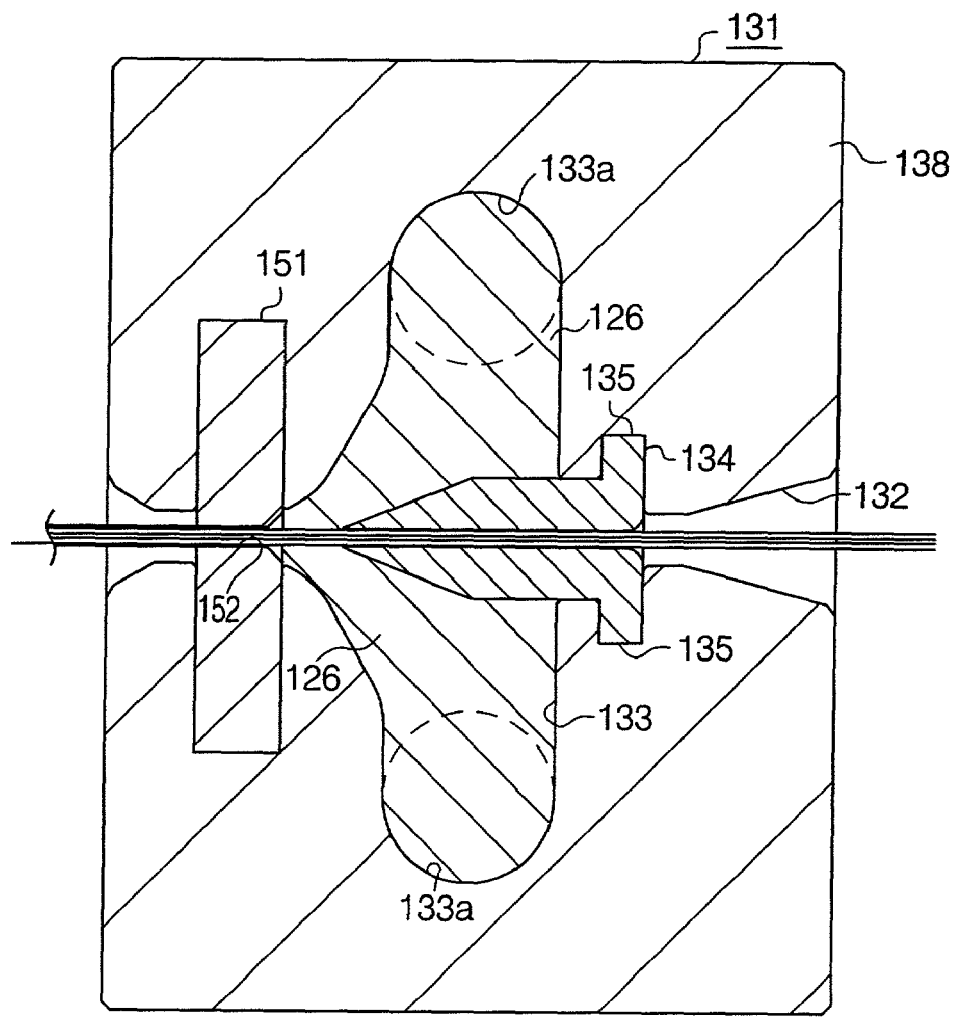
FIG. 30 is a cross-sectional view showing a rubber coater for manufacturing the ribbon in FIG. 28.
Figure 35:
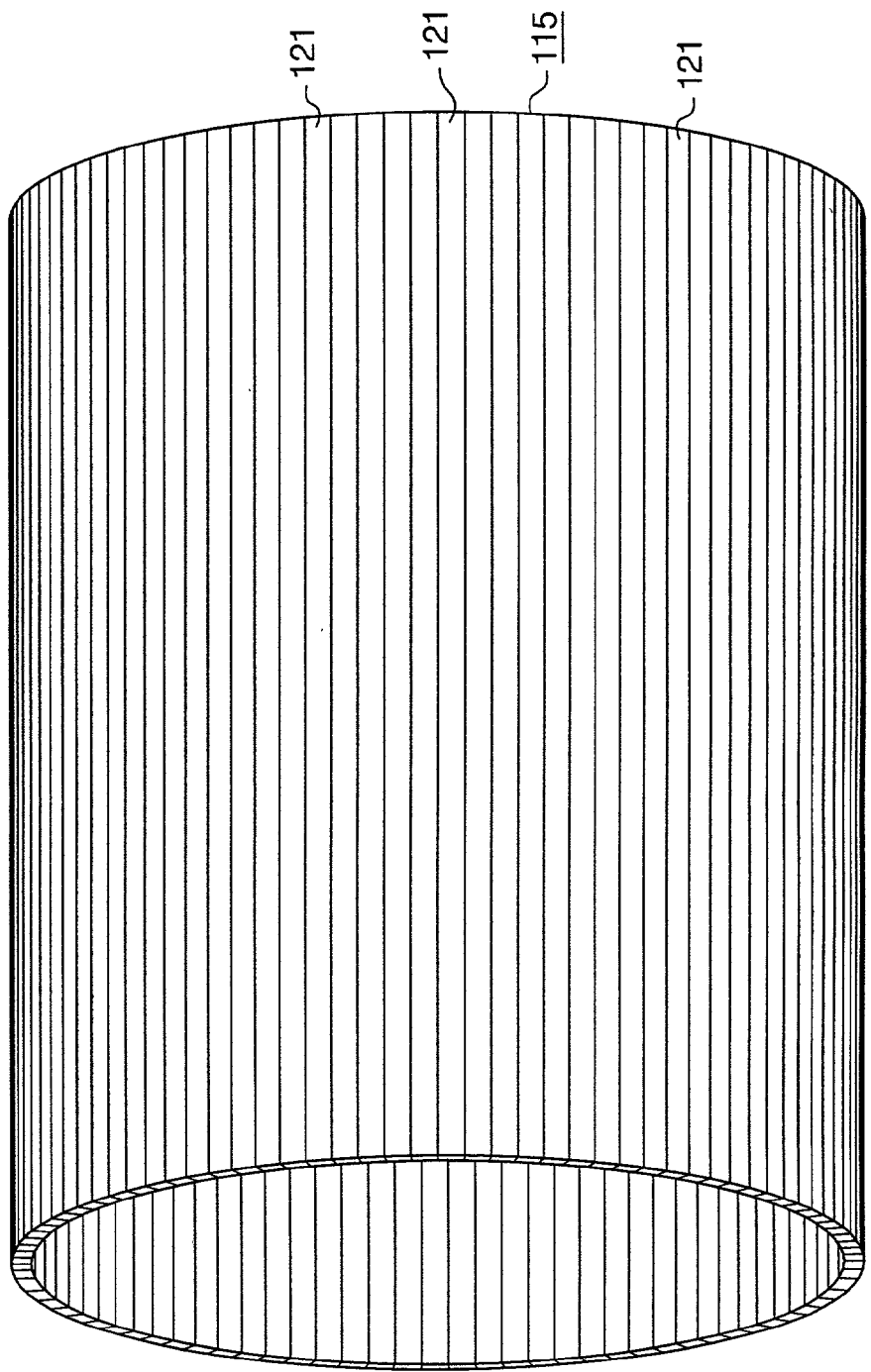
FIG. 35 is a perspective view showing a cylindrical body ply formed from the flat body ply in FIG. 34.

As shown in FIGS. 28, 29 and 35, the body ply 115 is made up of a large number of ribbon pieces 121. Side edges of two adjacent ribbon pieces 121 are adhered to each other. The ribbon pieces 121 extend in parallel with the axial line of the tire 111, i.e., in a direction orthogonal to the circumferential direction of the tire 111. FIG. 35 shows the cylindrical body ply 115 before it is formed into a toroidal shape.

As shown in FIGS. 28 and 29, each ribbon piece 121 is quadrilateral in cross section, more specifically, in the shape of parallelogram in cross section. Each ribbon piece 121 is formed by covering a pair of cord arrays 124, 125 made up of a plurality of parallel cords 123 (ten in this embodiment) with a rubber 126. The cords 123 are arranged to form a zigzag. In other words, both cord arrays 124, 125 are shifted from each other by one half of a pitch at which the cords 123 are arranged. There is a predetermined gap G which exists between each of the cords 123 of one pair of cord arrays 124, 125 and each of the cords 123 of the other pair of cord arrays 125, 124 adjacent thereto. This gap G is 0.1 to 1.5 times the diameter of the cords 123. The cords 123 are made, for example, of polyester.

A large number of ribbon pieces 121 making up the body ply 115 are made by cutting a single long ribbon 122. The ribbon 122 is manufactured by a rubber coater 131 shown in FIGS. 30 and 31. The rubber coater 131 comprises a casing 138 having a through path 132. A coating material chamber 133 filled with a material for the coating rubber 126 is formed halfway on the through path 132. The coating material chamber 133 has a pair of material supply ports 133a provided on both sides of the through path 132. These material supply ports 133a are supplied with a rubber material of the same type having the same hardness.

The pair of cord arrays 124, 125 is run to pass through the through path 132. As these cord arrays 124, 125 pass through the coating material chamber 133, they are coated with a rubber material within the coating material chamber 133. As a result, both cord arrays 124, 125 are embedded in the coating rubber 126, as shown in FIG. 29. The coating rubber 126 includes two rubber layers 126A, 126B which coat both cord arrays 124, 125, respectively. These rubber layers 126A, 126B are of the same type as each other, and have the same hardness.

Figure 31:
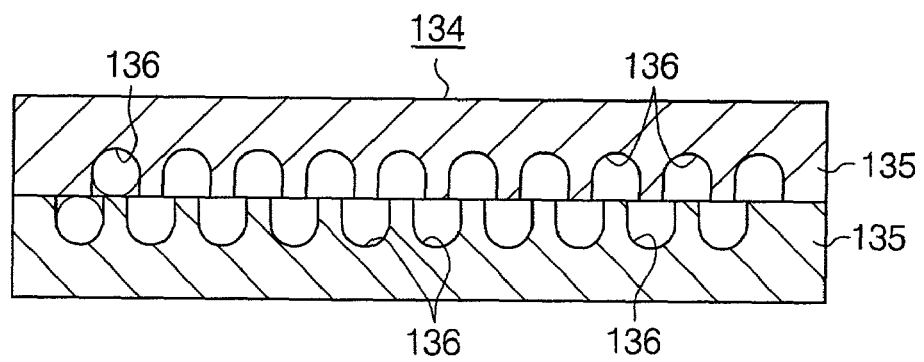
FIG. 31 is a cross-sectional view of a guide member provided in the rubber coater in FIG. 30.

At an entrance of the coating material chamber 133, a guide member 134 is incorporated for guiding the cord arrays 124, 125. As shown in FIG. 31, the guide member 134 comprises a pair of guide pieces 135 corresponding to both cord arrays 124, 125. Each guide piece 135 has a plurality of guide grooves 136 for guiding the cords 123. The number of guide grooves 136 formed in each guide piece 135 is the same as the number of cords 123 of a corresponding cord array 124, 125. The guide grooves 136 on each guide piece 135 are open to the other guide piece 135. Each guide groove 136 has a semi-arc portion in its deep portion, such that the cords 123 are guided to run by the semi-arc portions. The guide grooves 136 of one guide piece 135 are shifted with respect to the guide grooves 136 of the other guide piece 135 by one half of a pitch at which the guide grooves 136 are arranged. Thus, in an arrangement as shown in FIG. 29, the cords 123 passing in the guide grooves 136 are coated with the rubber 126 in the coating material chamber 133.

A collet 151 having an exit hole 152, which has the shape of parallelogram in cross section, is incorporated in an exit of the coating material chamber 133. As the cords 123 coated with the rubber 126 in the coating material chamber 133 pass the exit hole 152, an unvulcanized ribbon 122 having a cross-sectional shape corresponding to the cross-sectional shape of the exit hole 152 is extruded. The ribbon 122 has a width of 5 to 35 mm, for example.

Figure 32:
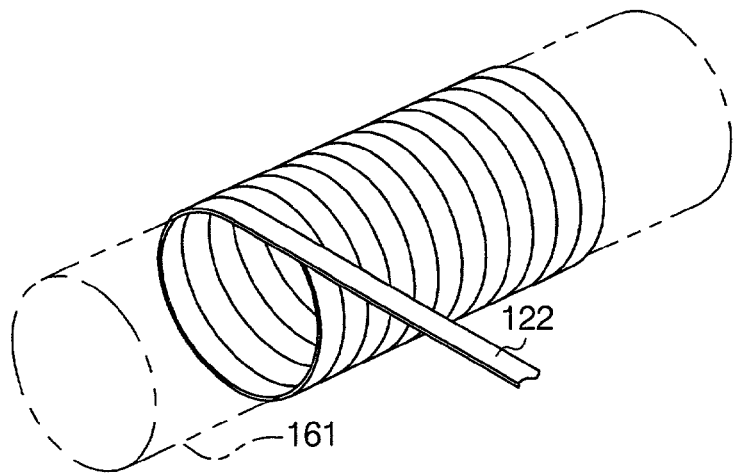
FIG. 32 is a perspective view showing how the ribbon manufactured by the rubber coater in FIG. 30 is spirally wound.
Figure 33:
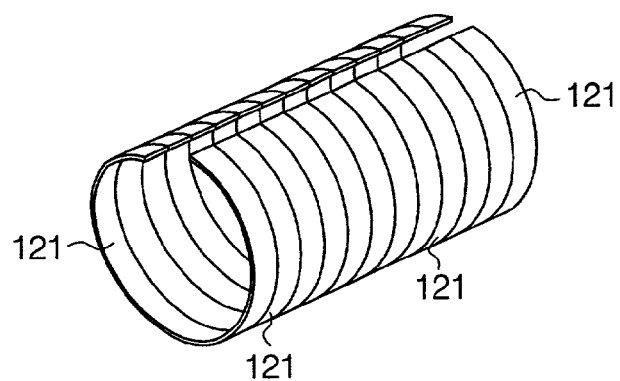
FIG. 33 is a perspective view showing how a cylinder formed of the wound ribbon in FIG. 32 is cut.
Figure 34:
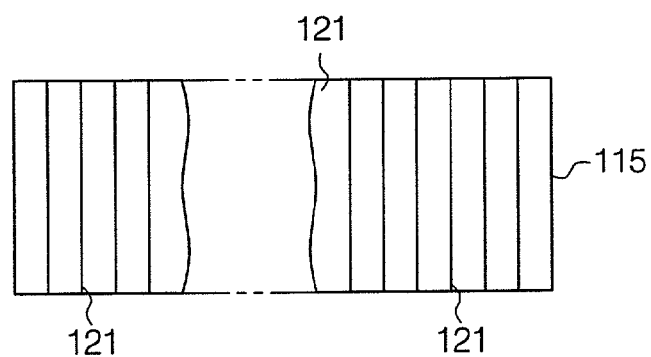
FIG. 34 is a plan view showing how the cut cylinder in FIG. 33 is extended into a plane shape.

The extruded ribbon 122 is spirally wound around a cylindrical drum 161, as shown in FIG. 32, such that side edges are in close contact with each other, resulting in the formation of a cylindrical body formed of the wound ribbon 122. Next, as shown in FIG. 33, the cylindrical body is cut along a direction orthogonal to a spiral angle, in other words, along a direction orthogonal to a direction in which the ribbon 122 extends. The cut cylindrical body is developed in the planar state as shown in FIG. 34. As a result, a body ply 155 in the shape of rectangular sheet made up of a large number of ribbon pieces 121 is provided.

Next, the sheet-shaped body ply 115 is wound around a cylindrical drum, not shown, such that the ribbon pieces 121 extend along the axial line of the cylindrical drum. As a result, the cylindrical body ply 115 is provided, as shown in FIG. 35.

Subsequently, the foregoing cylindrical body ply 115 is formed into a toroidal shape, for example, by use of the tire forming apparatus described in the respective embodiments in FIGS. 1 to 26. One of both rubber layers 126A, 126B in the ribbon 122 is positioned on the outer side or inner side of the toroidal body ply 115. As shown in FIG. 36, both rubber layers 126A, 126B present the hardness "A65" as represented in JIS hardness. This hardness of rubber is found when a vulcanized rubber is measured under an environment at 25° C. Rubber hardnesses shown in the following description are values under similar conditions as well.

Subsequently, a variety of tire parts such as belts 114a, 114g, a tread rubber 119, a side wall rubber 113a and the like are mounted to the toroidal body ply 115 to form a green tire. Then, the green tire is vulcanized to complete a tire 111 as shown in FIG. 27.

The foregoing embodiment has the following advantages.

The body ply 115 is manufactured using the elongated ribbon 122. Unlike the prior art, there is no need for manufacturing a wide and long sheet-shaped product for use as a material for the body ply. The number of cords 123 in each cord array 124, 125 within the ribbon 122 is relatively small, and the width of the ribbon 122 is as narrow as 5 to 35 mm. Therefore, the rubber coater 131 for manufacturing the ribbon 122, and a variety of machines for handling the ribbon 122 may be small in size. Therefore, small facilities and space are only required for manufacturing the body ply 115, resulting in a reduction in the tire manufacturing cost.

The body ply 115 in two-layer structure is readily formed by a single type of ribbon 122 having two layers of cord arrays 124, 125. Unlike the prior art, there is no need for providing two types of body plies for manufacturing a body ply in two-layer structure. This results in the simplification of the facilities required to manufacture the body ply 115, and like simplification of manufacturing process and process management.

The guide member 134 in the rubber coater 131 prevents disturbance in the arrangement of the cords 123 during the formation of the ribbon 122. Also, the body ply 115 is formed by continuously and uniformly winding the elongated ribbon 122. Thus, the cords 123 are substantially free from disturbance in the arrangement within the body ply 115, leading to the production of a high performance tire which excels in uniformity.

In the ribbon 122, the cords 123 are arranged to form a zigzag. Therefore, the spacing between both cord arrays 124, 125 can be reduced. It is therefore possible to reduce the thickness of the body ply 115 and the weight of the tire.

Both rubber layers 126A, 126B of the ribbon 122 are of the same type, and have the same hardness as each other. Therefore, the ribbon 122 is high in productivity. Also, by setting the rubber hardness of the ribbon 122 as appropriate, the resulting tire provides a vehicle driving stability and a riding quality in a well balanced state.

Next, a ribbon according to a sixth embodiment of the present invention will be described with reference to FIGS. 37 and 38, mainly on differences between the sixth embodiment and the fifth embodiment in FIGS. 27 to 36. In the sixth embodiment, the cord arrays 124, 125 employ different types of cords 123. Specifically, as shown in FIG. 37, cords 127 in one cord array 124 have a diameter larger than cords 123 in the other cord array 125. Also, a pitch at which the cords 127 are arranged in the one cord array 124 is twice as large as a pitch at which the cords 123 are arranged in the other cord array 125.

FIG. 38 shows a guide member 134 for use in the manufacturing of the ribbon in FIG. 37. As shown in FIG.

38, each guide piece 135 of the guide member 134 has guide grooves 136 corresponding to the cord arrays 124, 125 to be guided. Specifically, the guide grooves 136 in one guide piece 135 are larger than the guide grooves 136 in the other guide piece 135. Also, the guide grooves 136 are arranged in the one guide piece 135 at a pitch twice as large as a pitch at which the guide grooves 136 are arranged in the other guide piece 135.

In the sixth embodiment, the larger diameter cords 127 have a strength higher than the smaller diameter cords 123. The smaller diameter cords 123 are smaller in wire diameter and better in fatigue resistance than the larger diameter cords 127. Therefore, the cord array 124 made up of the larger diameter cords 127 is disposed on the outer side of the tire, and the cord array 125 made up of the smaller diameter cords 123 is disposed on the inner side of the tire to provide the resulting tire which is high in strength and low in susceptibility to fatigue. Even when an organic fiber material (rayon, polyester or the like) is used as the cords 123, 127, or even when an inorganic fiber material (steel or the like) is used, marvelous effects can be provided.

In addition, other than employing the cord arrays 124, 125 which are different in cord diameter and arrangement pitch, the following implementations are also possible.

A steel cord which exhibits a high cutting resistance may be used as cords for a cord array disposed on the outer side of the tire (hereinafter called the "outer cord array"), while an aramid cord may be employed as cords for a cord array disposed on the inner side of the tire (hereinafter called the "inner cord array"). For example, a steel cord for use in this case may be made up of a core formed of two twisted wires having a diameter of 0.20 mm, and four wires having a diameter of 0.20 mm twisted around the core. On the other hand, an aramid cord for use in this case may be made up of two twisted bundle wires having a size of 830 dtex.

Alternatively, each cord array may be made of cords having a different ductility. In this case, for example, cords twisted a different number of times are employed for each cord array. Cords twisted a larger number of times have a larger ductility. As an example, a cord for use in this case may be two bundles of twisted polyester cords having a size of 1670 dtex. Then, cords in the outer cord array are twisted forty times per 10 cm, while cords in the inner cord array are twisted 36 times per 10 cm. In this way, distortions in tire are absorbed by the difference in ductility between the respective cord arrays during the vulcanization of a green tire to readily provide a uniform tire without distortions.

Further alternatively, the cords may be twisted in a different direction for each cord array. As an example, the diameter and the number of wires making up a cord (for example, a steel cord) are identical for any of both cord arrays. Then, wires disposed in the outermost layer of a cord are twisted in a different direction for each cord array. In this event, the cords in the outer cord array are twisted in the clockwise direction, while the cords in the inner cord array are twisted in the counter-clockwise direction. In this way, residual torsion remaining in both cord arrays can be canceled by each other to form a completely flat ribbon free of distortion. Similar advantages are also provided when adjacent cords in the same cord array are twisted in different directions.

Other than the foregoing, a variety of modifications can be made. For example, cords may be made up of a different number of wires having a different diameter in each cord array. Alternatively, an organic fiber (nylon, rayon, polyester, aramid or the like) may be used for cords in one cord array, while an inorganic fiber (steel, carbon or the like) may be used for cords in the other cord array.

As described above, tires having desired characteristics can be readily provided by changing as appropriate the type, number, arrangement and the like of cords in accordance with the strength, performance and the like required for the body ply 115. Similar advantages are provided as well when different types of cords are used in the same cord array.

Figure 40:
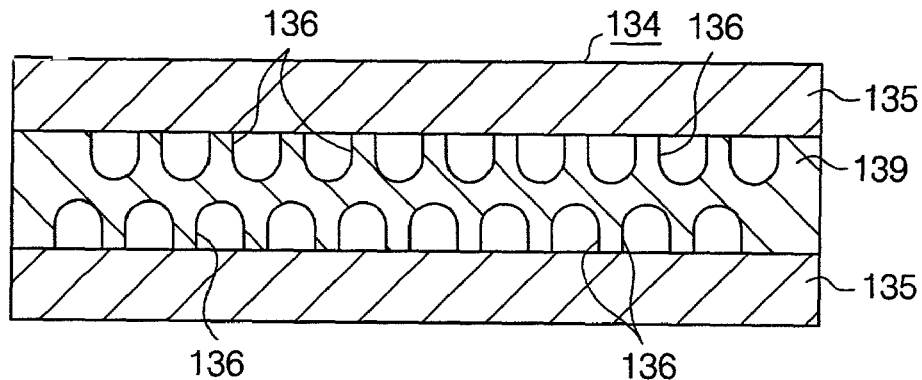
FIG. 40 is a cross-sectional view of a guide member for use in the manufacturing of the ribbon in FIG. 39.
Figure 41:
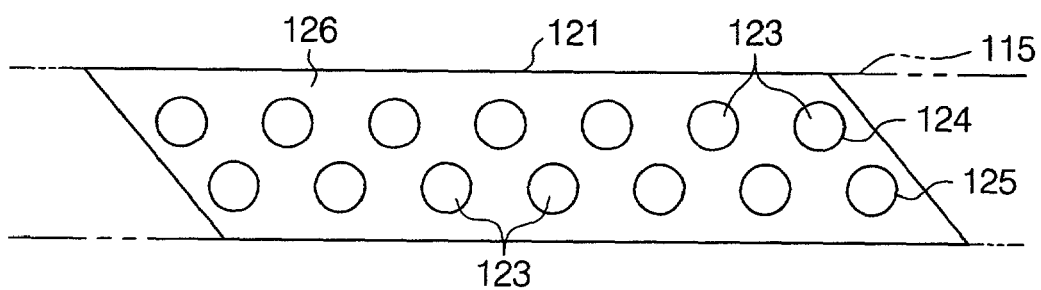
FIG. 41 is a cross-sectional view of a ribbon in an exemplary modification.

A ribbon according to a seventh embodiment shown in FIGS. 39 to 41 has a larger spacing between both cord arrays 124, 125, as compared with the fifth embodiment in FIGS. 27 to 36. The number of cords 123 in each cord array 124, 125 is chosen to be ten in an example of FIG. 39, and seven in an example of FIG. 41.

FIG. 40 shows a guide member 134 for use in the manufacturing of the ribbon in FIG. 39. As shown in FIG. 40, the guide member 134 comprises a pair of guide pieces without guide grooves; and an intermediate guide piece 139 disposed between these guide pieces 135 and having guide grooves 136 in two lines. The guide grooves 136 in two lines are formed on a pair of outer surfaces of the intermediate guide piece 139 which oppose both guide pieces 135.

In the seventh embodiment, since there is a large spacing between both cord arrays 124, 125, the body ply 115 has a larger thickness. This not only improves cushioning properties of tires but also effectively helps absorb impact energy. The body ply is unlikely to be damaged even if the tire runs on a curb or drops into a large hole on a road.

Figure 42:
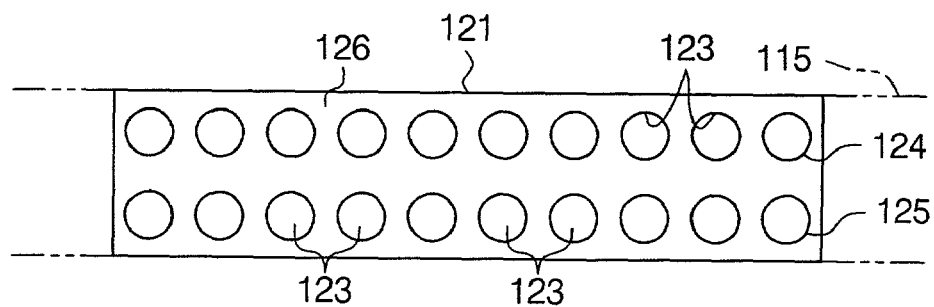
FIG. 42 is a cross-sectional view of a ribbon in an eighth embodiment of the present invention.
Figure 46:
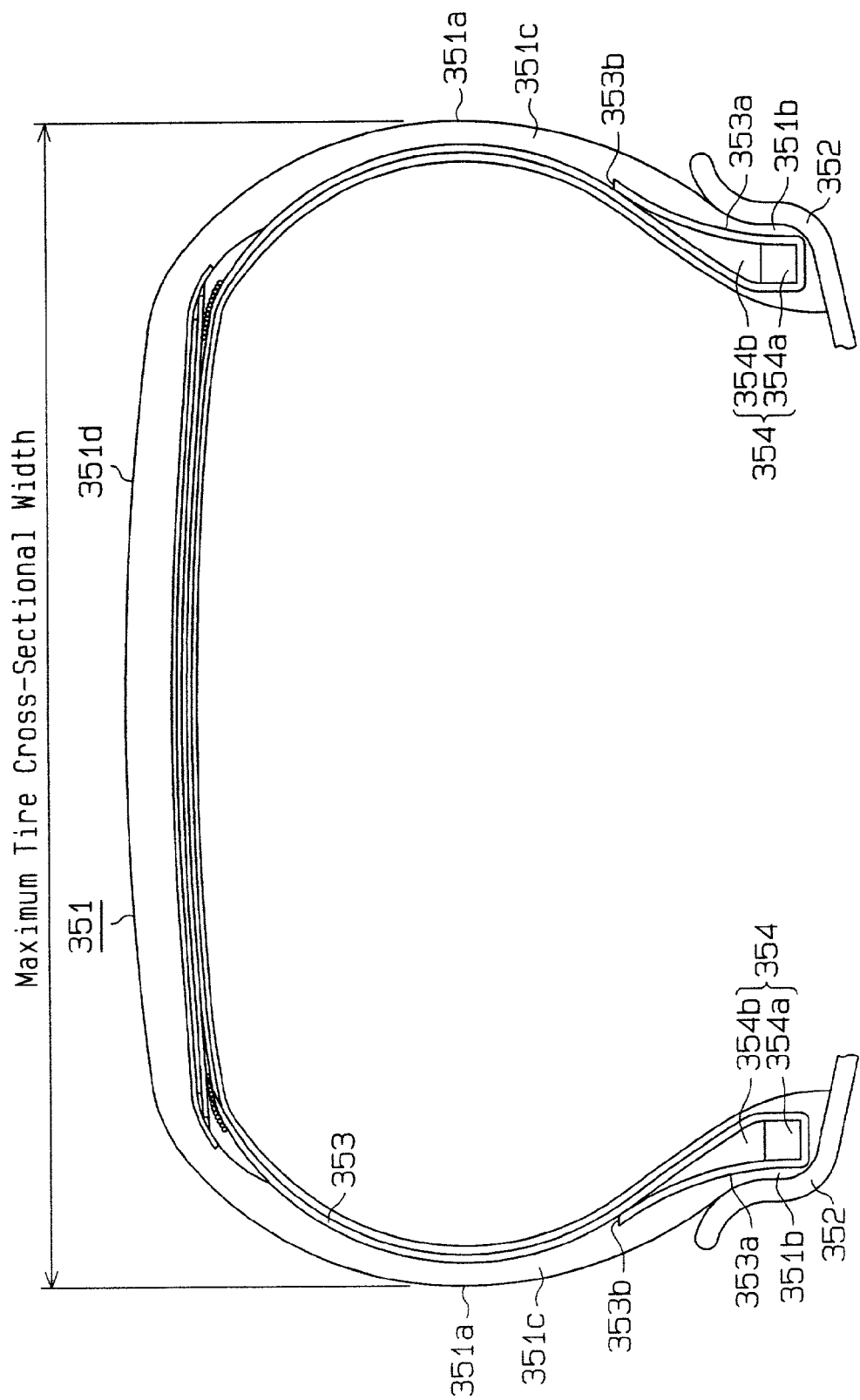
FIG. 46 is a cross-sectional view of a conventional tire.
Figure 47:
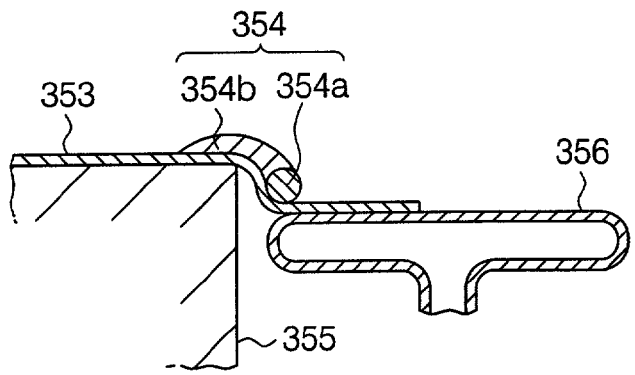
FIGS. 47(a) to 47(c) are partial cross-sectional views generally showing in order a conventional tire manufacturing process.
Figure 47:
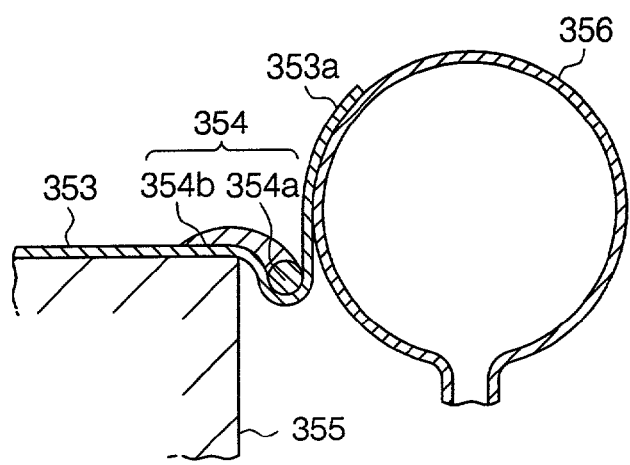
Figure 47:
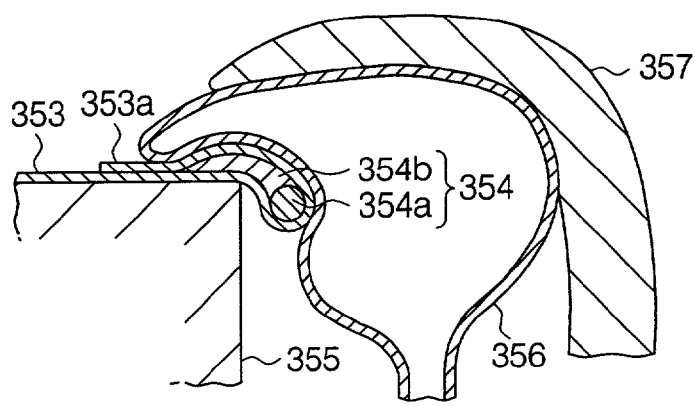

In an eighth embodiment shown in FIGS. 42 and 43, a ribbon 122 (ribbon piece 121) is made rectangular in cross section, and cords 123 in both cord arrays 124, 125 are not arranged to form a zigzag, but match in the thickness direction of a body ply 115.

FIG. 43 shows a guide member 134 for use in the manufacturing of the ribbon in FIG. 42. The guide member 134 has guide grooves 136 in both guide pieces 135 which match in the thickness direction of the guide member 134 to correspond to the arrangement of the cords 123 in FIG. 42. Though not specifically shown, a collet 151 has an exit hole 152 (see FIG. 30) which is rectangular in cross section.

In a ribbon according to a ninth embodiment shown in FIGS. 44 and 45, both rubber layers 126A, 126B are different in type (characteristics) from each other. To manufacture such a ribbon, different types of rubber materials are supplied respectively to both material supply ports 133a of the rubber coater 131 shown in FIG. 30. As shown in a table of FIG. 44, in Example 1, a rubber layer 126B disposed on the outer side of a tire has "A68" as represented by the JIS hardness, while a rubber layer 126A disposed on the inner side of the tire has "A65" as represented by the JIS hardness. In other words, the rubber layer 126B disposed on the outer side of the tire is harder than the rubber layer 126A disposed on the inner side of the tire. In Example 2, contrary to Example 1, the rubber layer 126B disposed on the outer side of the tire has "A62" as represented by the JIS hardness, while the rubber layer 126A disposed on the inner side of the tire has "A68" as represented by the JIS hardness. In other words, the rubber layer 126B disposed on the outer side of the tire is softer than the rubber layer 126A disposed on the inner side of the tire.

In Example 1, an increased rigidity on the outer side of the tire results in a tire which excels in driving stability of vehicle. In Example 2, an increased flexibility of the tire improves the riding quality of vehicle. Moreover, since the hard rubber layer 126A is disposed on the inner side of the tire, the cords 123 are prevented from springing out toward the inner liner 120 (see FIG. 27).

In the respective embodiments in FIGS. 27 to 45, three or more cord arrays may be provided in one ribbon 122. The resulting tire is suitable for use with a large vehicle such as a truck, a bus or the like.

In the respective embodiments in FIGS. 27 to 45, a spacer may be interposed between both guide pieces 135 in the guide member 134 for increasing the gap G between the cords 123 in both cord arrays 124, 125.

The cylindrical body ply 115 shown in FIG. 35 is formed by winding the sheet-shaped body ply 115 once around a cylindrical drum. Alternatively, the sheet-shaped body ply 115 may be wound a plurality of times around the cylindrical drum to form a cylindrical body ply 115 having a multi-layer structure. In this case, in FIG. 32, the ribbon 122 is wound such that the axial length of the cylinder made up of the wound ribbon 122 is longer by a plurality of times than that when the cylindrical body ply 115 shown in FIG. 35 is formed. A tire using the body ply 115 having such a multi-layer structure is suitable for use in a very large vehicle.

While only a plurality of embodiments have been herein described, it should be apparent to those skilled in the art that the present invention may be embodied in other particular forms without departing from the spirit and scope of the invention. The present invention is not limited to the contents described herein, but may be modified within the appended claims.

What is claimed is:

1. A method of manufacturing a pneumatic tire, comprising the steps of:
   mounting a cylindrical body ply on a cylindrical surface of a tire forming apparatus;
   setting annular beads on both axial end portions of said cylindrical body ply;
   enlarging the diameter of an axial intermediate portion of said cylindrical body ply while narrowing the spacing between both axial ends of said cylindrical body ply; and
   moving bending members of the tire forming apparatus, said bending members being formed of rigid bodies, wherein said bending members are moved linearly and radially outward relative to the axis of said body ply to bend said both axial end portions of said body ply by said bending members, so that bent portions of said body ply wrap around the corresponding beads; and
   using pressing members of said tire forming apparatus to press said axial end portions, on which said beads are disposed, radially outward relative to the axis of said cylindrical body ply, prior to bending said both axial end portions of said body ply.

2. The method according to claim 1, wherein said axial end portions of said cylindrical body ply on which said beads are disposed are pressed by said pressing members to come into close contact with said beads such that said axial end portions do not slip off said beads.

3. The method according to claim 1, wherein said pressing members press said axial end portions of said cylindrical body ply on which said beads are disposed in positions adjacent to said bending members.

4. The method according to claim 1, wherein the diameter of the axial intermediate portion of said cylindrical body ply is enlarged, while keeping said axial end portions of said cylindrical body ply, on which said beads are disposed, pressed by said pressing members.

5. The method according to claim 4, wherein said step of enlarging the diameter of an axial intermediate portion of said cylindrical body ply includes supplying compressed air into an inner space of a bladder to inflate said bladder, wherein said bladder forms said cylindrical surface.

6. The method according to claim 1, wherein positions at which said beads are disposed with respect to said cylindrical body ply are set such that said bent portions of said body ply are limited within a region of a wheel rim when a tire comprising said body ply is mounted on the wheel rim.

7. The method according to claim 6, wherein the positions at which said beads are disposed with respect to said cylindrical body ply are set such that the positions of edges of said bent portions stay within one half of the height of a flange in said wheel rim.

8. The method according to claim 1, further comprising the step of mounting a bead insert ply to each bead prior to setting each bead on said cylindrical body ply.

9. The method according to claim 1, further comprising:
   stacking a plurality of cord arrays, each made up of a plurality of parallel cords;
   coating said cord arrays with a coating rubber to create an elongated ribbon which is substantially rectangular in cross section;
   winding said ribbon spirally to form a cylinder;
   cutting said cylinder in a direction orthogonal to a direction in which said ribbon extends to create a sheet-shaped plane body ply; and
   forming said cylindrical body ply from said sheet-shaped body ply, said cords extending along the axial line of said cylindrical body ply.

10. A method of manufacturing a pneumatic tire, comprising the steps of:
   mounting a cylindrical body ply on a cylindrical surface of a tire forming apparatus;
   setting annular beads on both axial end portions of said cylindrical body ply;
   using pressing members of said tire forming apparatus, wherein said pressing members are formed of rigid bodies, to press said axial end portions of said cylindrical body ply on which said beads are disposed radially outward relative to the axis of said cylindrical body ply to bring said axial end portions into close contact with said beads;
   enlarging the diameter of an axial intermediate portion of said cylindrical body ply while narrowing the spacing between both axial ends of said cylindrical body ply; and
   moving bending members of the tire forming apparatus, said bending members being formed of rigid bodies, wherein said bending members are moved linearly and radially outward relative to the axis of said body ply to bend said both axial end portions of said body ply by said bending members, so that bent portions of said body ply wrap around the corresponding beads,
   wherein said step of enlarging the diameter of an axial intermediate portion of said cylindrical body ply includes supplying compressed air into an inner space of a bladder to inflate said bladder, wherein said bladder forms said cylindrical surface.

* * * * *